United States Patent
Trenchard et al.

(10) Patent No.: US 12,298,722 B2
(45) Date of Patent: May 13, 2025

(54) APPARATUS AND METHOD FOR AUTOMATED IDENTIFICATION AND DIAGNOSIS OF CONSTRAINT VIOLATIONS

(71) Applicant: Honeywell International Inc., Morris Plains, NJ (US)

(72) Inventors: Andrew John Trenchard, Romsey (GB); Christopher J. Webb, Scottsdale, AZ (US); Sanjay K. Dave, Bangalore (IN); Michael Niemiec, Dexter, MI (US); Mandar Vartak, Bangalore (IN); Sriram Hallihole, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 15/972,432

(22) Filed: May 7, 2018

(65) Prior Publication Data

US 2018/0356811 A1    Dec. 13, 2018

Related U.S. Application Data

(60) Provisional application No. 62/518,474, filed on Jun. 12, 2017, provisional application No. 62/518,397, (Continued)

(51) Int. Cl.
*G05B 19/4063* (2006.01)
*G05B 13/04* (2006.01)
(Continued)

(52) U.S. Cl.
CPC ......... *G05B 13/041* (2013.01); *G05B 19/406* (2013.01); *G05B 19/4063* (2013.01);
(Continued)

(58) Field of Classification Search
None
See application file for complete search history.

(56) References Cited

U.S. PATENT DOCUMENTS

| 5,287,390 A | 2/1994 | Scarola et al. |
| 5,351,184 A | 9/1994 | Lu et al. |

(Continued)

FOREIGN PATENT DOCUMENTS

| WO | 0020939 A1 | 4/2000 |
| WO | 2004070569 A2 | 8/2004 |

(Continued)

OTHER PUBLICATIONS

International Search Report and Written Opinion of the International Searching Authority regarding International Patent Application No. PCT/US2016/031595 dated Aug. 18, 2016, 15 pages.

(Continued)

*Primary Examiner* — Kenneth M Lo
*Assistant Examiner* — Istiaque Ahmed

(57) ABSTRACT

A method includes obtaining data identifying values of one or more process variables associated with an industrial process controller and identifying one or more constraint violations using the data. The method also includes, for each identified constraint violation, analyzing a behavior of the controller, a behavior of an industrial process being controlled, and how the controller was being used by at least one operator for a period of time. At least part of the period of time is prior to the identified constraint violation. The method further includes generating a graphical display based on the analysis, where the graphical display identifies one or more probable causes for at least one of the one or more constraint violations.

20 Claims, 11 Drawing Sheets

Related U.S. Application Data filed on Jun. 12, 2017, provisional application No. 62/518,478, filed on Jun. 12, 2017, provisional application No. 62/518,352, filed on Jun. 12, 2017.

(51) Int. Cl.
*G05B 19/406* (2006.01)
*G05B 19/418* (2006.01)
*G05B 23/02* (2006.01)

(52) U.S. Cl.
CPC . *G05B 19/41875* (2013.01); *G05B 19/41885* (2013.01); *G05B 23/0272* (2013.01); *G05B 2219/23292* (2013.01); *G05B 2219/31359* (2013.01); *G05B 2219/37001* (2013.01)

(56) References Cited

U.S. PATENT DOCUMENTS

| | | | |
|---|---|---|---|
| 5,602,761 A | 2/1997 | Spoerre et al. | |
| 5,715,178 A * | 2/1998 | Scarola | G05B 9/03 702/116 |
| 6,577,323 B1 | 6/2003 | Jamieson et al. | |
| 6,666,049 B1 | 12/2003 | Katende et al. | |
| 6,901,560 B1 | 5/2005 | Guerlain et al. | |
| 7,421,374 B2 | 9/2008 | Zhan et al. | |
| 8,108,790 B2 | 1/2012 | Morrison, Jr. et al. | |
| 8,185,217 B2 | 5/2012 | Thiele | |
| 9,715,221 B2 | 7/2017 | Zheng et al. | |
| 2002/0173935 A1* | 11/2002 | Miura | G05B 19/41875 702/182 |
| 2003/0056147 A1* | 3/2003 | Yutkowitz | G05B 11/28 714/25 |
| 2004/0049299 A1 | 3/2004 | Wojsznis et al. | |
| 2005/0075738 A1 | 4/2005 | Attarwala | |
| 2005/0137721 A1 | 6/2005 | Attarwala | |
| 2005/0149208 A1 | 7/2005 | Harmse et al. | |
| 2005/0171626 A1 | 8/2005 | Schwarm | |
| 2005/0222813 A1* | 10/2005 | Bjornson | G06Q 10/06 702/183 |
| 2006/0095394 A1* | 5/2006 | Miller | G05B 13/0275 706/45 |
| 2006/0143547 A1* | 6/2006 | Haaks | D21G 9/0009 714/47.1 |
| 2007/0225835 A1 | 9/2007 | Zhu | |
| 2007/0255442 A1* | 11/2007 | Nakamura | G05B 23/024 700/108 |
| 2007/0268122 A1 | 11/2007 | Kow et al. | |
| 2007/0276512 A1 | 11/2007 | Fan et al. | |
| 2008/0015726 A1* | 1/2008 | Harvey, Jr. | G05B 23/0281 700/110 |
| 2008/0065242 A1 | 3/2008 | Attarwala | |
| 2008/0125898 A1* | 5/2008 | Harvey | G05B 23/0281 700/110 |
| 2008/0140227 A1 | 6/2008 | Attarwala | |
| 2008/0243289 A1 | 10/2008 | Yelchuru et al. | |
| 2008/0244449 A1 | 10/2008 | Morrison et al. | |
| 2008/0276137 A1* | 11/2008 | Lin | G05B 23/0267 714/57 |
| 2009/0043546 A1 | 2/2009 | Srinivasan et al. | |
| 2009/0062933 A1* | 3/2009 | Eryurek | G05B 23/0272 700/12 |
| 2009/0204245 A1 | 8/2009 | Sustaeta et al. | |
| 2009/0287319 A1 | 11/2009 | Attarwala | |
| 2009/0319059 A1 | 12/2009 | Renfro et al. | |
| 2010/0082396 A1 | 4/2010 | Caldwell et al. | |
| 2010/0156654 A1 | 6/2010 | Bullemer et al. | |
| 2010/0241247 A1 | 9/2010 | Attarwala | |
| 2010/0318934 A1* | 12/2010 | Blevins | G05B 13/048 715/772 |
| 2011/0130850 A1 | 6/2011 | Zheng et al. | |
| 2011/0258568 A1 | 10/2011 | Pandurangan et al. | |
| 2013/0317629 A1 | 11/2013 | Shapiro et al. | |
| 2014/0273847 A1 | 9/2014 | Nixon et al. | |
| 2014/0277605 A1* | 9/2014 | Nixon | G05B 11/01 700/49 |
| 2014/0330402 A1 | 11/2014 | Keenan et al. | |
| 2014/0344007 A1 | 11/2014 | Shende et al. | |
| 2015/0123589 A1* | 5/2015 | Matsutani | G05B 23/0224 318/652 |
| 2015/0134647 A1 | 5/2015 | Sayyarrodsari et al. | |
| 2015/0371418 A1 | 12/2015 | Laycock et al. | |
| 2016/0017574 A1* | 1/2016 | Adachi | E02F 9/2054 701/31.4 |
| 2016/0171414 A1* | 6/2016 | Lee | G06Q 10/06393 705/7.39 |
| 2016/0234242 A1 | 8/2016 | Knapp et al. | |
| 2016/0349740 A1 | 12/2016 | Niemiec et al. | |
| 2017/0102694 A1* | 4/2017 | Enver | G05B 19/41875 |
| 2017/0248942 A1* | 8/2017 | Sudo | G05B 23/0232 |
| 2017/0357240 A1 | 12/2017 | Stewart et al. | |
| 2018/0032940 A1 | 2/2018 | Trenchard et al. | |
| 2018/0356773 A1 | 12/2018 | Trenchard et al. | |

FOREIGN PATENT DOCUMENTS

| | | |
|---|---|---|
| WO | 2007067645 A2 | 6/2007 |
| WO | 2009120362 A2 | 10/2009 |
| WO | 2013087973 A1 | 6/2013 |

OTHER PUBLICATIONS

Martin et al., "Estimating control function benefits," Hydrocarbon Processing 69, 1991, pp. 68-73.
Webb et al., "Using Advanced Control to Monitor Unit Performance and Economics," American Institute of Chemical Engineers, 2018 Spring Meeting and 14th Global Congress on Process Safety, Apr. 2018, 21 pages.
Dave et al., "Apparatus and Method for Estimating Impacts of Operational Problems in Advanced Control Operations for Industrial Control Systems", U.S. Appl. No. 15/972,534, filed May 7, 2018, 46 pages.
Vartak et al., "Apparatus and Method for Identifying, Visualizing, and Triggering Workflows From Auto-Suggested Actions to Reclaim Lost Benefits of Model-Based Industrial Process Controllers", U.S. Appl. No. 15/972,535, filed May 7, 2018, 37 pages.
Trenchard et al., "Apparatus and Method for Identifying Impacts and Causes of Variability or Control Giveaway on Model-Based Controller Performance", U.S. Appl. No. 15/973,272, filed May 7, 2018, 70 pages.
AU2018285616, Examination Report—1, pp. 3, Oct. 27, 2020.
R. K. Chohan, et al., "Safety and Fault Detection in Process Control Systems and Sensors," Fire Safety Journal, 14(1989) 167-177.
Extended European Search Report, Application No. 18817368.6, Jan. 14, 2021 (10 pgs).

* cited by examiner

APPARATUS AND METHOD FOR AUTOMATED IDENTIFICATION AND DIAGNOSIS OF CONSTRAINT VIOLATIONS

CROSS-REFERENCE TO RELATED APPLICATIONS AND PRIORITY CLAIM

This application claims priority under 35 U.S.C. § 119(e) to the following U.S. provisional patent applications:
- U.S. Provisional Patent Application No. 62/518,352 filed on Jun. 12, 2017;
- U.S. Provisional Patent Application No. 62/518,397 filed on Jun. 12, 2017;
- U.S. Provisional Patent Application No. 62/518,474 filed on Jun. 12, 2017; and
- U.S. Provisional Patent Application No. 62/518,478 filed on Jun. 12, 2017.

All of these provisional applications are hereby incorporated by reference in their entirety.

TECHNICAL FIELD

This disclosure relates generally to industrial process control and automation systems. More specifically, this disclosure relates to an apparatus and method for automated identification and diagnosis of constraint violations.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators.

Model-based industrial process controllers are one type of process controller routinely used to control the operations of industrial processes. Model-based process controllers typically use one or more models to mathematically represent how one or more properties within an industrial process respond to changes made to the industrial process. Unfortunately, the benefits that can be obtained using model-based controllers often decline over time. This can be due to a number of factors, such as inaccurate models, misconfiguration, or operator actions. In some extreme cases, the benefits that could be obtained using model-based controllers can be reduced by up to fifty percent or even more over time.

SUMMARY

This disclosure provides an apparatus and method for automated identification and diagnosis of constraint violations.

In a first embodiment, a method includes obtaining data identifying values of one or more process variables associated with an industrial process controller and identifying one or more constraint violations using the data. The method also includes, for each identified constraint violation, analyzing a behavior of the controller, a behavior of an industrial process being controlled, and how the controller was being used by at least one operator for a period of time. At least part of the period of time is prior to the identified constraint violation. The method further includes generating a graphical display based on the analysis, where the graphical display identifies one or more probable causes for at least one of the one or more constraint violations.

In a second embodiment, an apparatus includes at least one interface configured to receive data identifying values of one or more process variables associated with an industrial process controller. The apparatus also includes at least one processor configured to identify one or more constraint violations using the data. The at least one processor is also configured, for each identified constraint violation, to analyze a behavior of the controller, a behavior of an industrial process being controlled, and how the controller was being used by at least one operator for a period of time. At least part of the period of time is prior to the identified constraint violation. The at least one processor is further configured to generate a graphical display based on the analysis, where the graphical display identifies one or more probable causes for at least one of the one or more constraint violations.

In a third embodiment, a non-transitory computer readable medium contains instructions that when executed cause at least one processing device to obtain data identifying values of one or more process variables associated with an industrial process controller and identify one or more constraint violations using the data. The medium also contains instructions that when executed cause the at least one processing device, for each identified constraint violation, to analyze a behavior of the controller, a behavior of an industrial process being controlled, and how the controller was being used by at least one operator for a period of time. At least part of the period of time is prior to the identified constraint violation. The medium further contains instructions that when executed cause the at least one processing device to generate a graphical display based on the analysis, where the graphical display identifies one or more probable causes for at least one of the one or more constraint violations.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
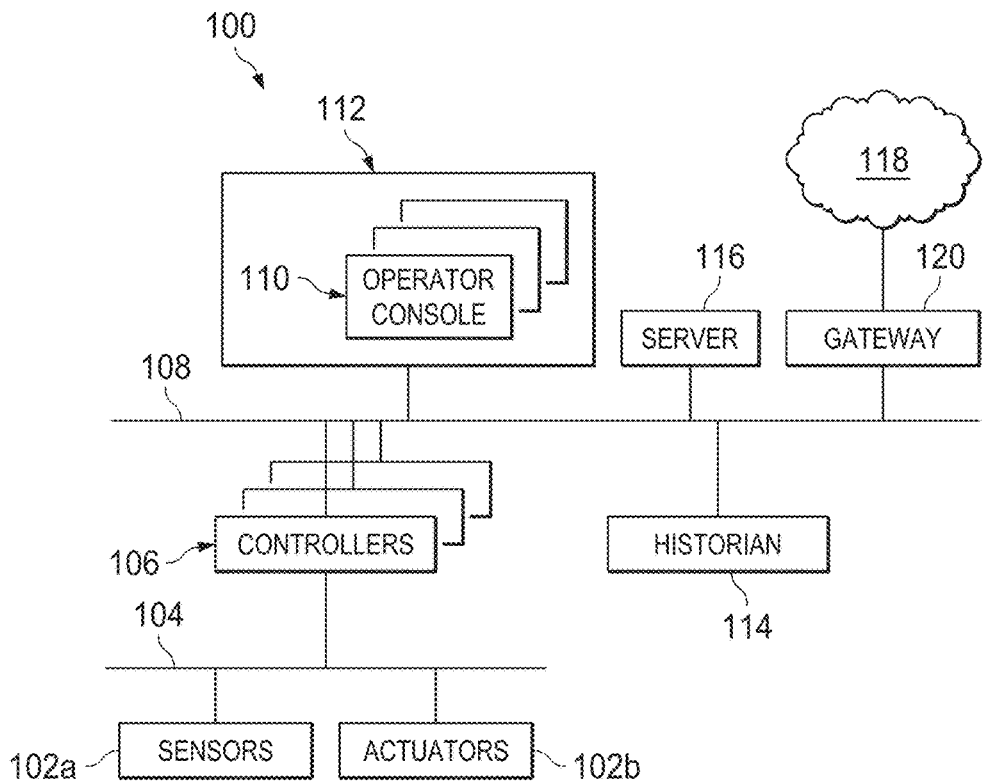
FIG. 1 illustrates an example industrial process control and automation system according to this disclosure.

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, model-based industrial process controllers are one type of process controller routinely used to control the operations of industrial processes. Model-based process controllers can help to improve the performance of continuous or other industrial processes. For example, in industrial processes, a controlled variable (CV) generally represents a process variable that can be measured or inferred and that is ideally controlled to be at or near a desired setpoint or within a desired range of values. A manipulated variable (MV) generally represents a process variable that can be adjusted in order to alter one or more controlled variables. A disturbance variable (DV) generally represents a process variable whose value can be considered but cannot be controlled. As a simple example, a flow rate of material through a pipe could denote a controlled variable, a valve opening for a valve that controls the flow rate of material could denote a manipulated variable, and an ambient temperature around the pipe or the valve could denote a disturbance variable.

In most instances, a normal operating envelope is placed on various process variables associated with equipment in an industrial process in order to define the safe and economically-viable operating region for the industrial process. A normal operating envelope is typically defined by a number of factors, such as equipment limit boundaries, safe operating conditions, environmental conditions, and quality constraints. An example equipment limit boundary could be defined when operating a pump discharge pressure above a seal pressure limit might damage the pump's seals and potentially lead to leakage of material. An example safe operating condition could be defined when operating a burner below its minimum design pressure might lead to flame instability, flame-out, and potentially a build-up of uncombusted gases and thereafter an explosion. An example environmental condition could be defined when operating a distillation column above its normal operating pressure might cause a control system to flare material. An example quality constraint could be defined when some off-specification deviations in product quality might be mitigated by judicious blending of materials but major deviations might require off-specification materials to be reprocessed.

Well-designed industrial processes often have automated protection systems (such as safety shutdown systems) that are used to prevent major excursions outside associated normal operating envelopes from causing equipment damage or safety incidents. However, a preventative action (such as a unit shutdown) that may be taken by an automated protection system in response to a major excursion outside a normal operating envelope can be very costly, particularly for continuous processes that run twenty-four hours a day and seven days a week.

One benefit normally associated with model-based controllers is that the controllers have the ability to optimize an industrial process close to the bounds of its normal operating envelope. The ability to monitor key constraint variables (at a much higher frequency than human operators) and the ability to maintain the key constraint variables within the normal operating envelope significantly reduces demand on the protection systems and the likelihood of a shutdown intervention. The model-based controllers also often help to manage important but non-safety-related constraints, which becomes more important as optimizers in the model-based controllers push industrial processes closer to some of their constraint boundaries. Even with the use of model-based controllers, however, constraint violations often still occur when at least one process variable moves outside of its associated constraints. Analyzing probable causes of constraint violations can be labor-intensive, difficult, and prone to error after the fact. This can be due to various factors, such as the presence of incomplete information and the complex interactive nature of model-based controllers.

This disclosure provides various techniques for analyzing information associated with a model-based controller to identify constraint violations, probable causes of the constraint violations, and optionally remedies for the constraint violations. Visualizations can be provided to help users identify the probable causes of the constraint violations and possible remedies, which can help to improve the speed of resolving the constraint violation issues.

In this way, these techniques help to assist operations managers, process engineers, control engineers, or other personnel in identifying significant violations of key process variable constraints and identifying probable causes of those constraint violations in order to enable corrective action to be taken. The results of the analyses can therefore be used to modify the operation of the model-based controller or other components in order to reduce the constraint violations, which can affect how the model-based controller controls the underlying industrial process.

Among other things, this could enable a new Industrial Internet of Things (IIoT) service or other service to be deployed, where the service can be used to reduce the cost of troubleshooting a model-based controller's performance and to improve the lifecycle benefits of the model-based controller. In particular embodiments, these techniques could be implemented using a computer program that periodically analyses batches of data collected from customers' premises as part of a cloud-based analytics solution. The resulting analysis conclusions could then be visualized to the customers using cloud-hosted dashboards to enable the customers, support engineering teams, or other personnel to view information and troubleshoot issues.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one of the controllers 106 shown in FIG. 1 denotes a model-based controller that operates using one or more process models. For example, each of these controllers 106 could operate using one or more process models to determine, based on measurements from one or more sensors 102a, how to adjust one or more actuators 102b. In some embodiments, each model associates one or more manipulated or disturbance variables (often referred to as independent variables) with one or more controlled variables (often referred to as dependent variables). Each of these controllers 106 could use an objective function to identify how to adjust its manipulated variables in order to push its controlled variables to be at or near the boundaries of a normal operating envelope.

At least one network 108 couples the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here may optionally include at least one historian 114 and/or one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

At least one component of the system 100 could support a mechanism for automated identification and diagnosis of process variable constraint violations. For example, this functionality could be implemented in an operator console 110, a server 116, or a computing cloud 118 or remote server. Among other things, this functionality can be used to identify and evaluate process variable constraint violations much more frequently in order to identify and help resolve probable causes for those constraint violations. Visualizations can also be provided, such as on displays of the operator consoles 110, to help users identify the constraint violations, the probable causes of the constraint violations, and possible courses of action to resolve the constraint violations. Ideally, this allows the constraint violations to be identified more easily and reduced over time after corrective action is taken, which can help to improve the operation of the model-based controllers 106. Additional details regarding this functionality are provided below.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. As a particular example, the historian 114 may be implemented in the computing cloud 118. Further, particular functions have been described as being performed by particular components of the system 100. This is for illustration only. In general, control and automation systems are highly configurable and can be configured in any suitable manner according to particular needs. In addition, FIG. 1 illustrates one example operational environment where automated identification and diagnosis of constraint violations can be used. This functionality can be used in any other suitable system.

Figure 2:
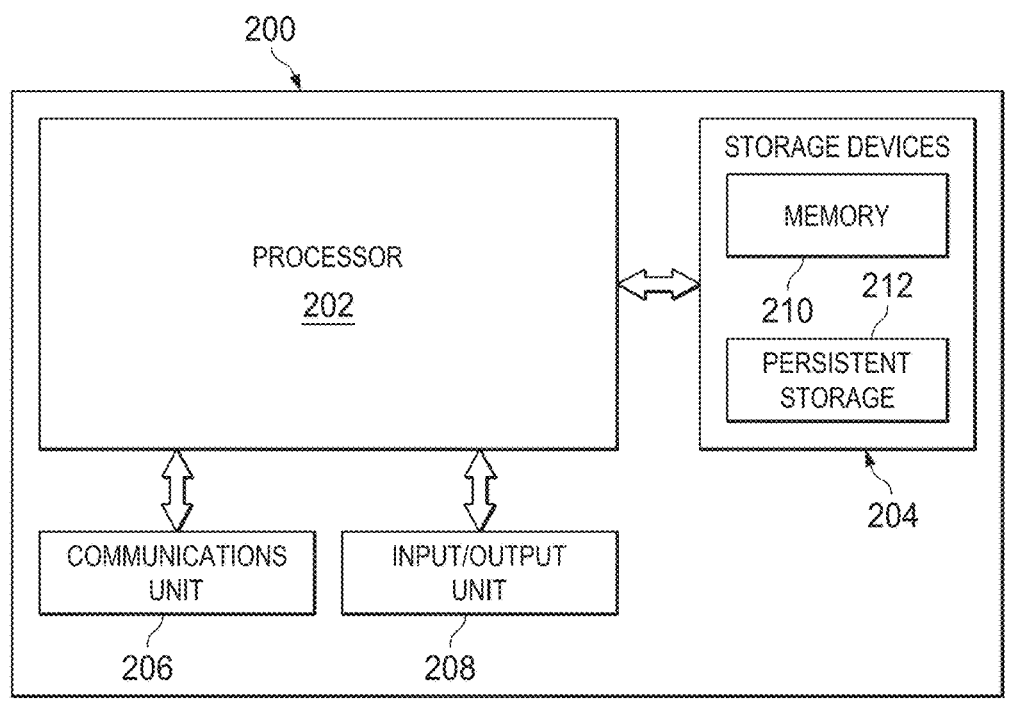
FIG. 2 illustrates an example device for automated identification and diagnosis of constraint violations according to this disclosure.

FIG. 2 illustrates an example device 200 for automated identification and diagnosis of constraint violations according to this disclosure. The device 200 could, for example, denote an operator console 110, server 116, or device used in the computing cloud 118 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could perform automated identification and diagnosis of constraint violations as described in this patent document. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for automated identification and diagnosis of constraint violations, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3:
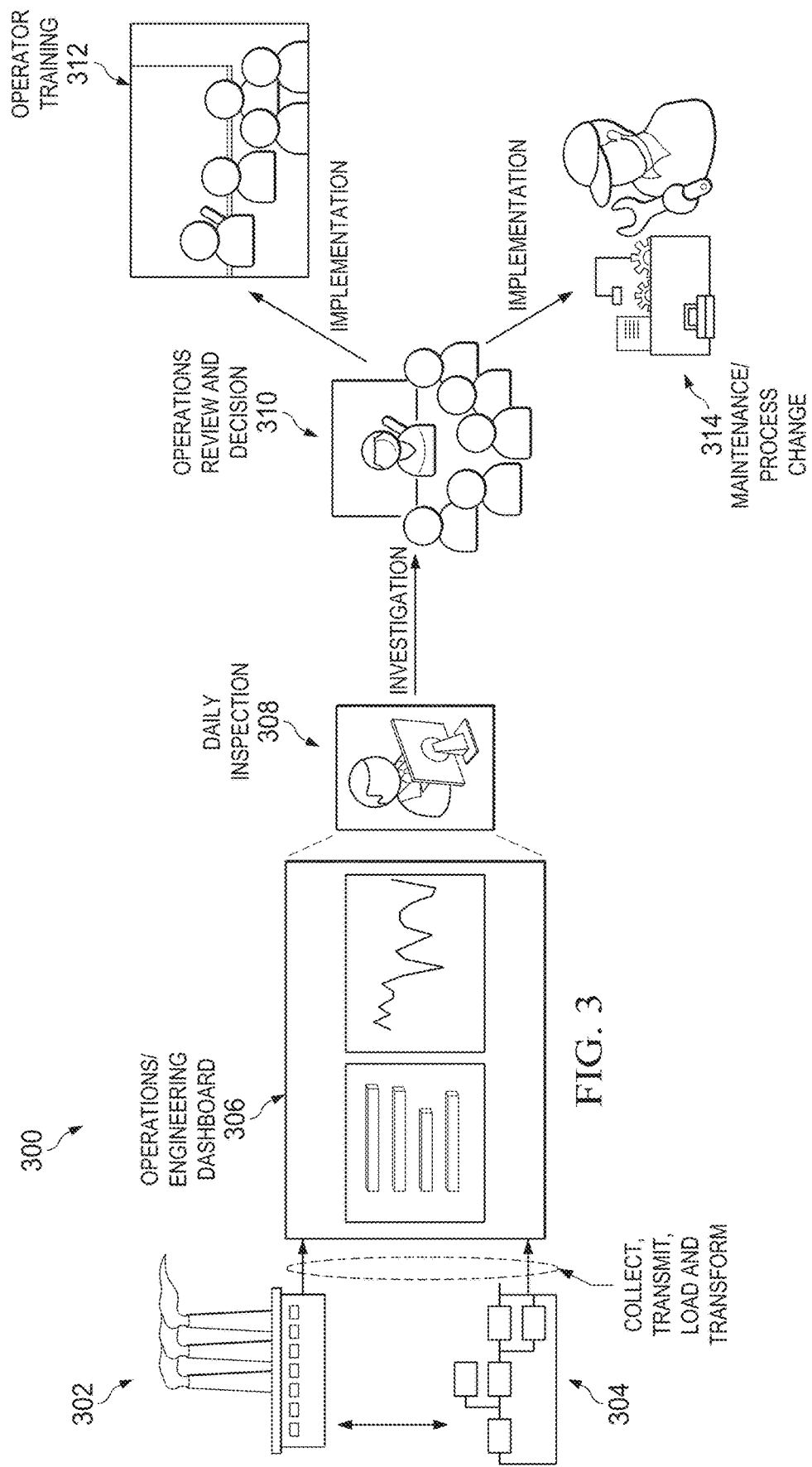
FIG. 3 illustrates an example process for automated identification and diagnosis of constraint violations according to this disclosure.

FIG. 3 illustrates an example process 300 for automated identification and diagnosis of constraint violations according to this disclosure. As shown in FIG. 3, data associated with at least one industrial process 302 and data associated with at least one industrial process control and automation system 304 (which could represent the system 100) can be collected. The data associated with the industrial process 302 could represent any suitable data, such as the values of various controlled, manipulated, and optionally disturbance variables. The data associated with the control and automation system 304 could also represent any suitable data, such as an identification of process variable constraints or other data used, generated, or collected by the system 304.

The data could be collected by any suitable device or system, such as an operator console 110, server 116, or device used in the computing cloud 118 described above with respect to FIG. 1. Also, while shown as being collected from the industrial process 302 and the system 304, the data could be obtained from any suitable source(s). For instance, the system 304 could collect data about the industrial process 302 and provide all of the data for analysis, or the data about the industrial process 302 and the system 304 could be stored in at least one historian or other database and retrieved for analysis. Note that a secure data transfer mechanism could be used to protect the data being collected and transmitted, and the data could be collected and transmitted in real-time, near real-time, or non-real-time depending on the implementation.

However the data is obtained, the data can be stored and analyzed periodically, continuously, or at other times in order to determine key process variable metrics and controller performance metrics. For example, the data can be analyzed as described below in order to identify the occurrences of process variable constraint violations associated with one or more model-based controllers, such as one or more controllers 106 operating in the system 304. The data can also be analyzed to identify probable causes of the identified process variable constraint violations and possibly potential remedies for the constraint violations.

In some embodiments, the results of the analysis can identify any key process variable constraint violations associated with a model-based controller 106, such as those associated with equipment operating boundaries, qualities, or environmental constraints and their causes. The results can also identify the overall contribution of the model-based controller 106 to some characteristic, such as the overall economic contribution of the controller (which could be expressed in terms of economics, material or energy usage, production, etc.). The results can further identify the issues limiting the performance of the model-based controller 106 and the relative impact of each issue. Example issues that could limit performance of the controller 106 may include an incorrect setting of one or more controller limits by an operator, instrumentation issues (such as sensor or valve issues), and increased process variance due to external disturbances, equipment issues, or control system tunings.

In some embodiments, the analysis of the collected data involves the use of a "digital twin" associated with a model-based controller's optimizer. In other words, a replica of the functionality of the controller's optimizer can be used during the analysis, such as to perform "what if" analyses to determine how the controller could have operated differently. This allows the analysis to determine whether operation of the controller could be improved, such as in a manner that could reduce or avoid process variable constraint violations. This also allows the analysis to determine the impacts (such as in terms of economics, material usage, energy usage, production, etc.) that the process variable constraint violations could have on an overall industrial process.

The results of the analysis can be used to generate one or more dashboards 306. The dashboards 306 can be viewed by one or more users to, among other things, identify process variable constraint violations and probable causes of the constraint violations. For example, the dashboards 306 could be used during daily inspections 308 to identify whether an investigation is needed into the impacts and potential causes of identified constraint violations. If so, review and decision personnel 310 could use the dashboards 306 to more closely investigate what might be causing the constraint violations. Once likely causes are identified, corrective action could be taken, such as scheduling operator training 312 or implementing changes 314 in the industrial process 302 or control and automation system 304. Of course, the dashboards 306 or the results of the analyses could be used in any other suitable manner.

In some embodiments, the analysis results can be presented in different dashboards 306 based on the roles of the users using the dashboards 306. For example, an operations management view in a dashboard 306 could allow an operations manager to understand the impacts of operator behaviors, equipment issues, and other external factors on a model-based controller 106 and consequently the impacts of those factors on performance of the industrial process 302 and the health of equipment in the industrial process 302. A process engineer's view in a dashboard 306 could highlight the impacts of key constraint limits on the performance of the industrial process 302. A control engineer's view in a dashboard 306 could provide detailed diagnostic insights into underlying causes of good or poor controller performance, possibly along with an assessment of the economic or other impacts of the underlying issues to help justify corrective actions (such as process or application maintenance or operator training).

One example goal here could be to provide a good line of sight between the issues that impact a model-based controller's performance and lost opportunity costs associated with those impacts. Another example goal could be to reduce the difficulty and cost of maintaining and improving the performance of the industrial process 302 and the model-based controller(s) 106 in the control and automation system 304. In specific embodiments, this approach can help to improve collaboration between the operations management, process engineering, and control engineering personnel in order to maintain and improve the performance of the industrial process 302 while leveraging the model-based controller(s) 106 to achieve the best effect. Note, however, that the approaches described in this patent document could be used in any other suitable manner.

Note that the analysis functionality could be deployed in various ways depending on the implementation. For example, the analysis functionality could be accessed by workstations or other computing devices via a web server. A batch execution engine could be used to execute various analysis routines, and an SQL or other database could be used to store and retrieve data for the analysis routines. The data analyzed by the analysis routines could be collected from UNIFIED REAL TIME (URT) platforms from HONEYWELL INTERNATIONAL INC., which could communicate data using Object Linking and Embedding (OLE) for Process Control (OPC) for storage in one or more process historians. The workstations or other computing devices, web server, platforms, and other devices could reside on the same level of a control and automation system, different levels of a control and automation system, or inside and outside a control and automation system. Additional features can also be used to facilitate more effective use of the analysis functionality. For instance, a knowledge repository could be used to capture knowledge from operational experiences and formalize the knowledge into engineering guidance notes, which can help to improve use and reduce troubleshooting efforts. Moreover, templates can be used to simplify analysis designs, a seed model library can be used to provide possible standard or custom analysis functions, and workflow support tools can be provided to guide less experience engineers or other users through the analysis implementation process. Note, however, that these details relate to specific implementations of the analysis functionality and that the analysis functionality could be deployed in any other suitable manner.

Although FIG. 3 illustrates one example of a process 300 for automated identification and diagnosis of constraint violations, various changes may be made to FIG. 3. For example, the data used in the analyses could be collected from any suitable source(s) and in any suitable manner. Also, the results of the analyses could be used in any suitable manner.

Figure 4:
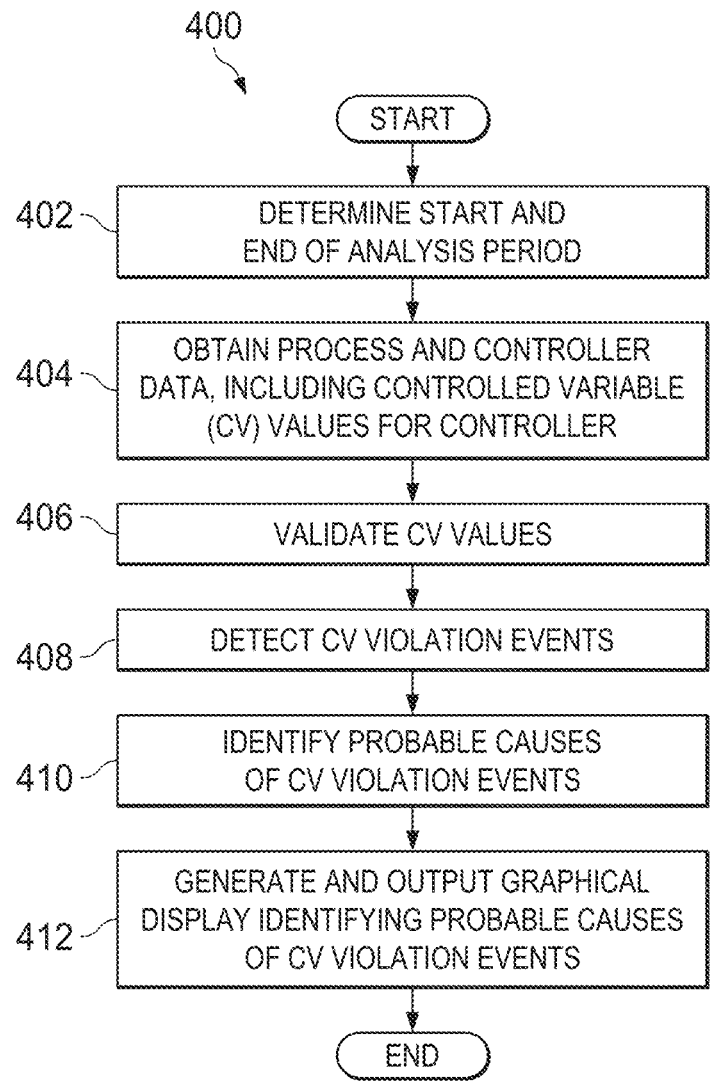
FIG. 4 illustrates an example method for automated identification and diagnosis of constraint violations according to this disclosure.

FIG. 4 illustrates an example method 400 for automated identification and diagnosis of constraint violations according to this disclosure. For ease of explanation, the method 400 is described as being performed by the device 200 of FIG. 2 implementing an operator console 110, server 116, or device used in the computing cloud 118 of FIG. 1. However, the method 400 could be used with any suitable device and in any suitable system.

As shown in FIG. 4, a start and an end of an analysis period are determined at step 402. This could include, for example, the processor 202 of the device 200 determining the period during which data associated with at least one model-based controller 106 will be analyzed. Any suitable period of time could be identified here, such as a particular day, week, month, or other period of time.

Data associated with an industrial process and with the model-based controller (including one or more controlled variables' values) during the identified period is obtained at step 404. This could include, for example, the processor 202 of the device 200 receiving controlled variable values or other process variable values directly from the model-based controller 106 or indirectly, such as via a historian 114, server 116, or gateway 120. Note that when the data is obtained by a device that is remote from the controller 106 or other data source, the data can be transmitted to the device securely and in real-time, near real-time, or non-real-time depending on the embodiment.

The controlled variable values are validated at step 406. This could include, for example, the processor 202 of the device 200 pre-processing the data to validate the obtained data and discard any portions of the obtained data deemed invalid. In some embodiments, the data can be validated by using predictions generated by the model-based controller 106 to identify valid or invalid data, retaining any valid data, and discarding any invalid data. As a particular example, this could include the processor 202 of the device 200 removing any gross instrument errors from the data, which may give false indications of process variable constraint violations.

Figure 5A:
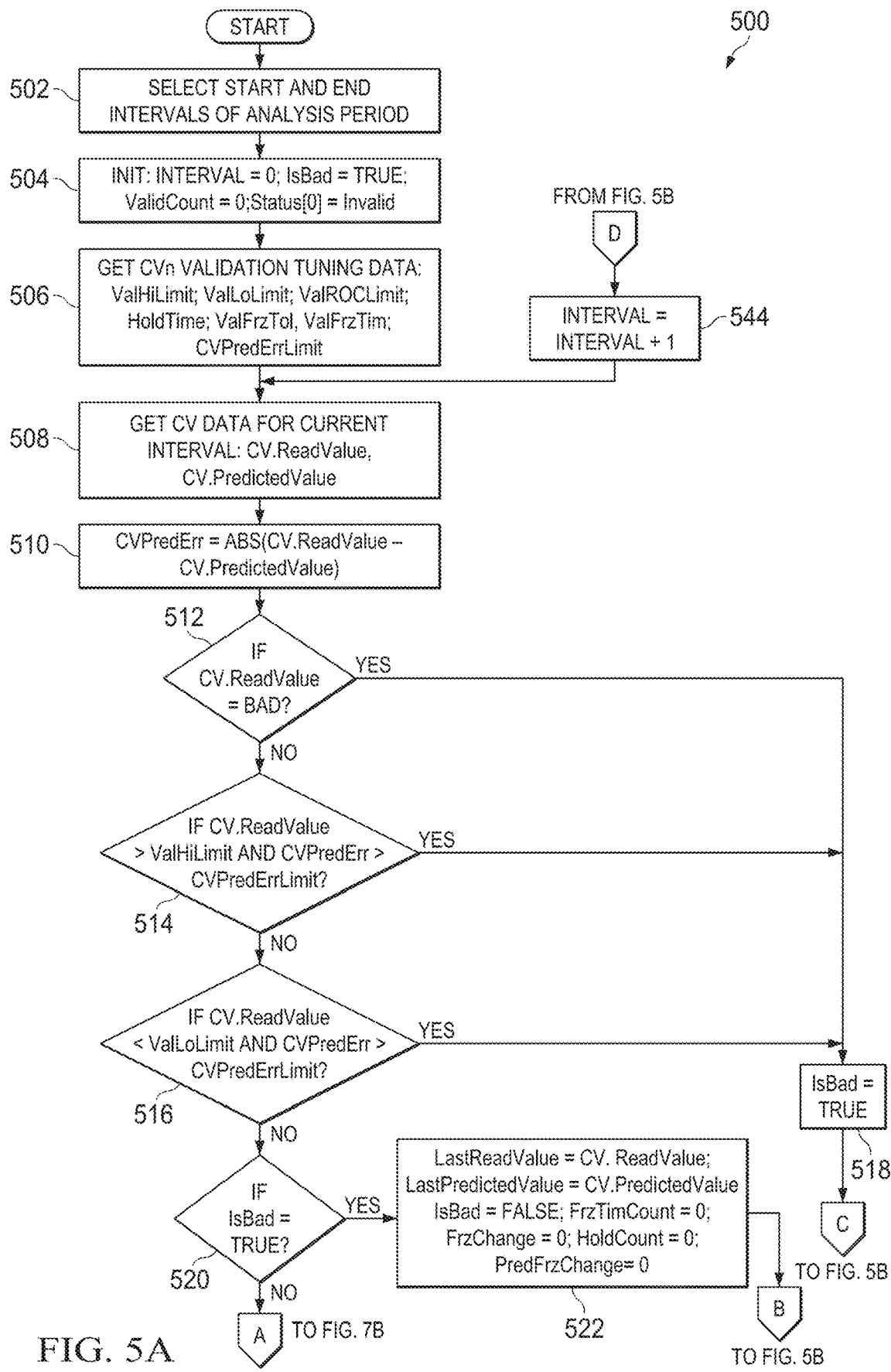
FIGS. 5A and 5B illustrate an example method for validating and filtering a process variable's value according to this disclosure.
Figure 5B:
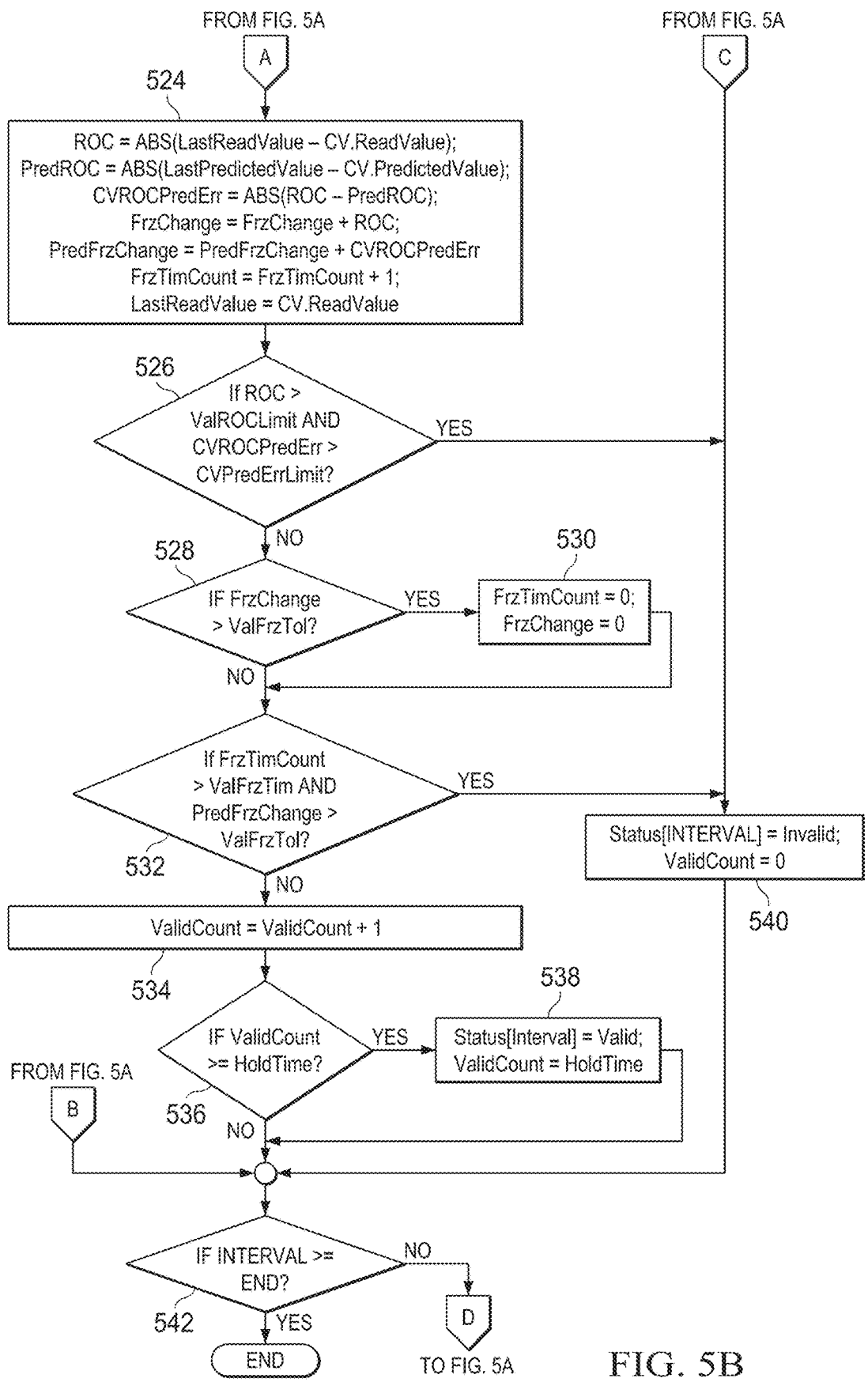

One example technique for validating and filtering process variable values is shown in FIGS. 5A and 5B, which are described below.

Figure 6A:
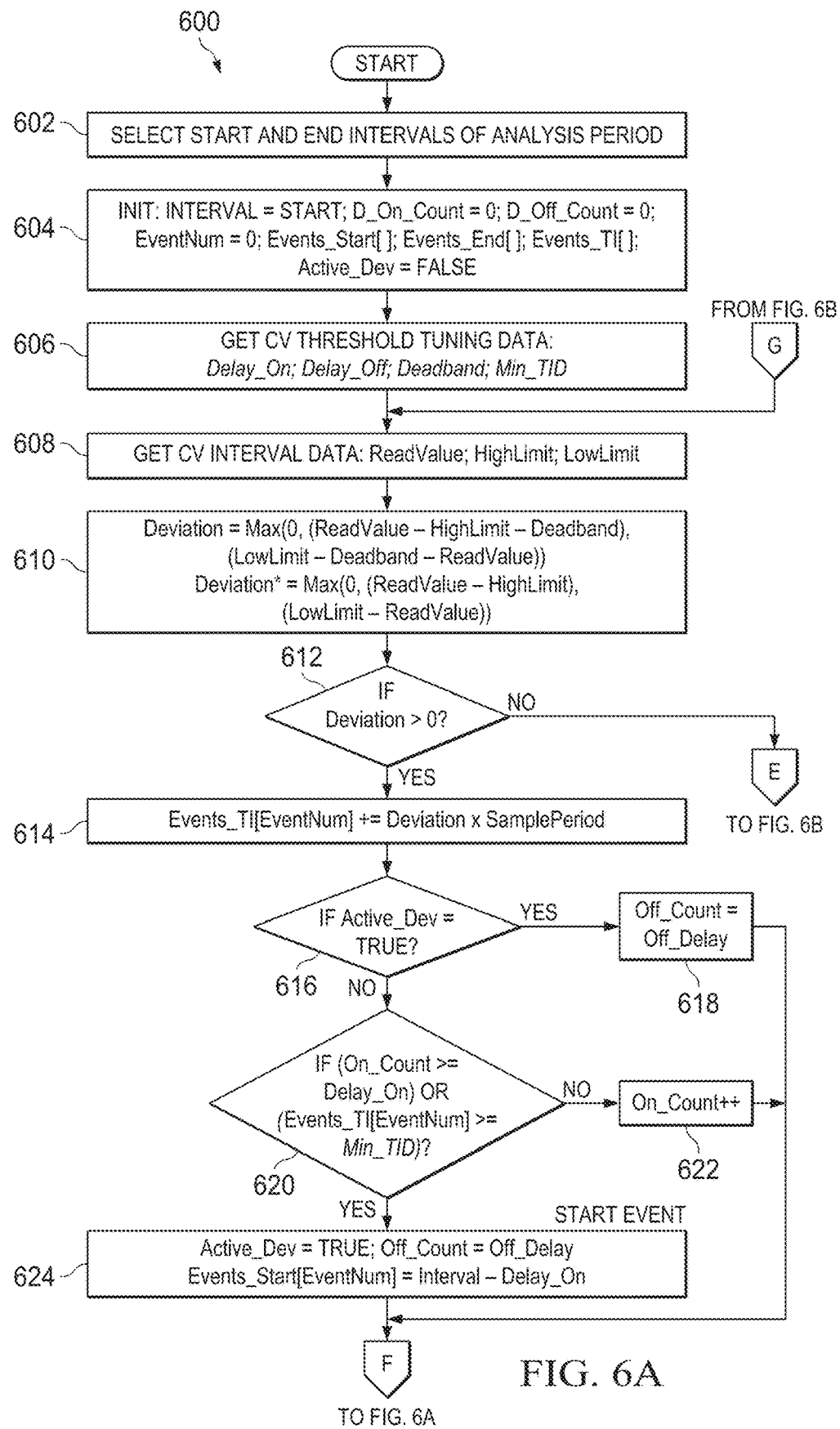
FIGS. 6A and 6B illustrate an example method for detecting process variable constraint violations according to this disclosure.
Figure 6B:
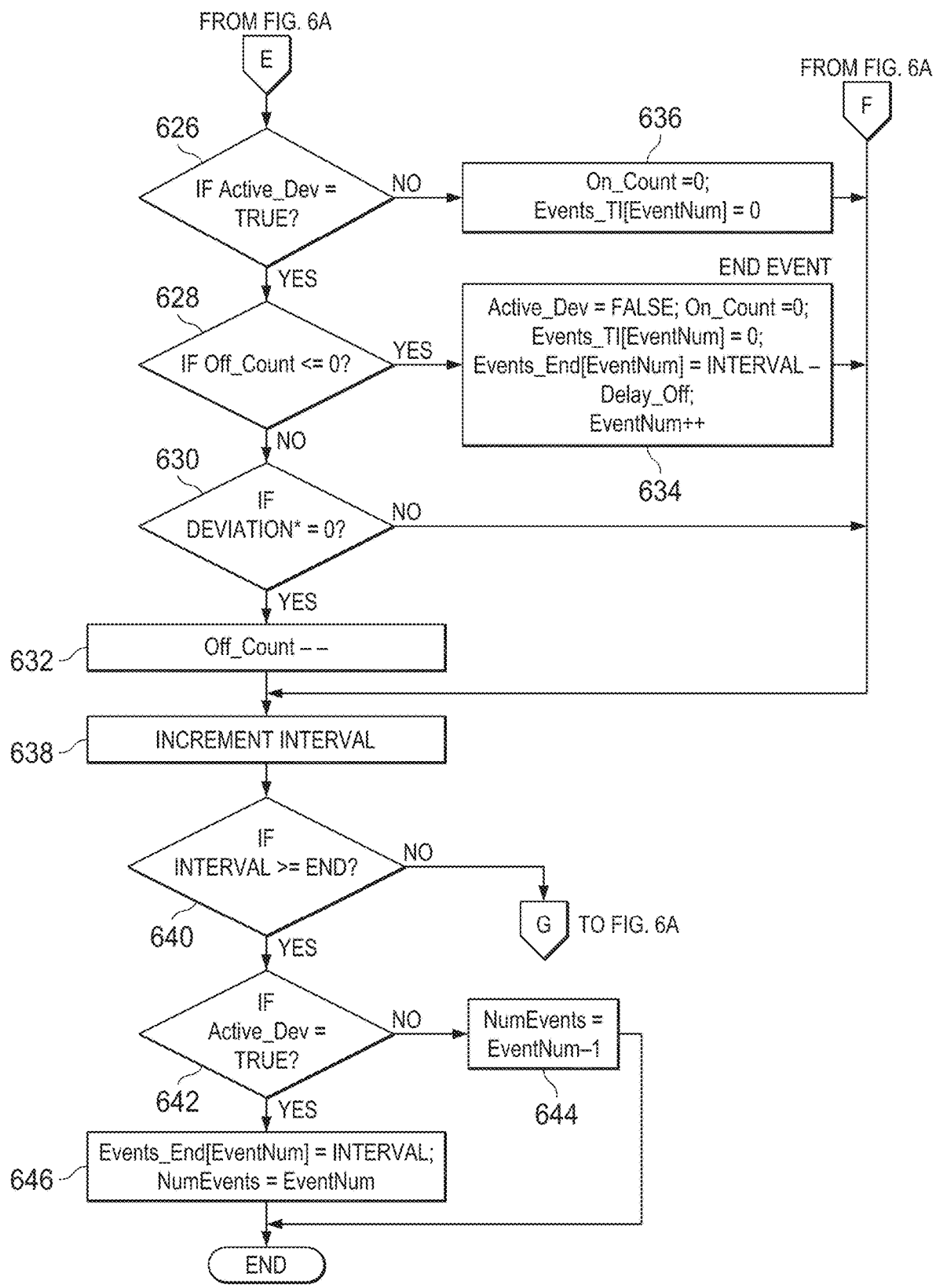

The data is analyzed to identify controlled variable constraint violation events at step 408. This could include, for example, the processor 202 of the device 200 processing the collected data to identify time periods when critical process variables or other process variables violated their associated constraints. Note that this analysis could occur continuously or on a periodic, repeating, or other basis. One example technique for identifying process variable constraint violations is shown in FIGS. 6A and 6B, which are described below.

Figure 7:
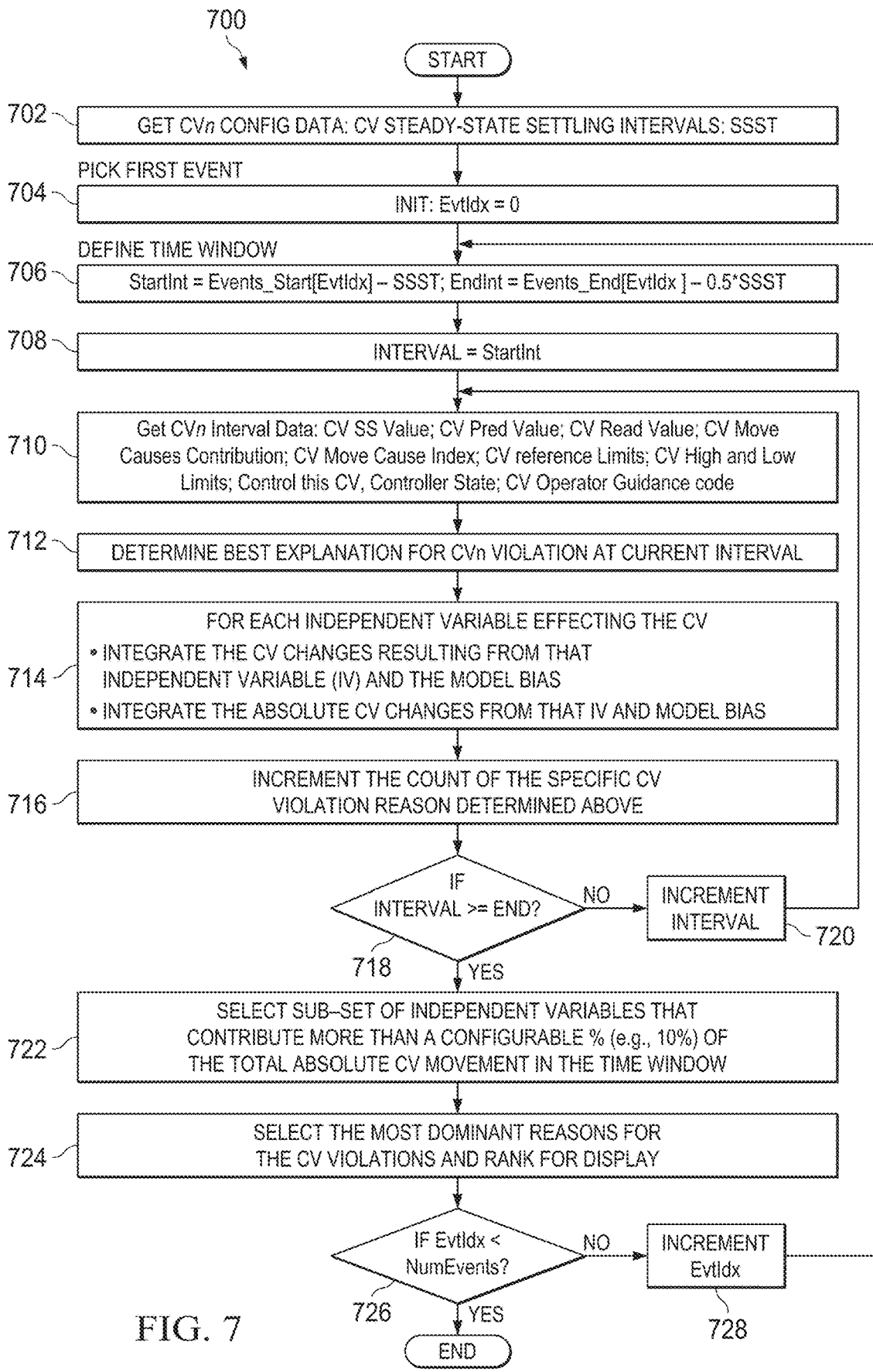
FIGS. 7 and 8 illustrate example methods for determining probable causes of process variable constraint violations according to this disclosure.
Figure 8:
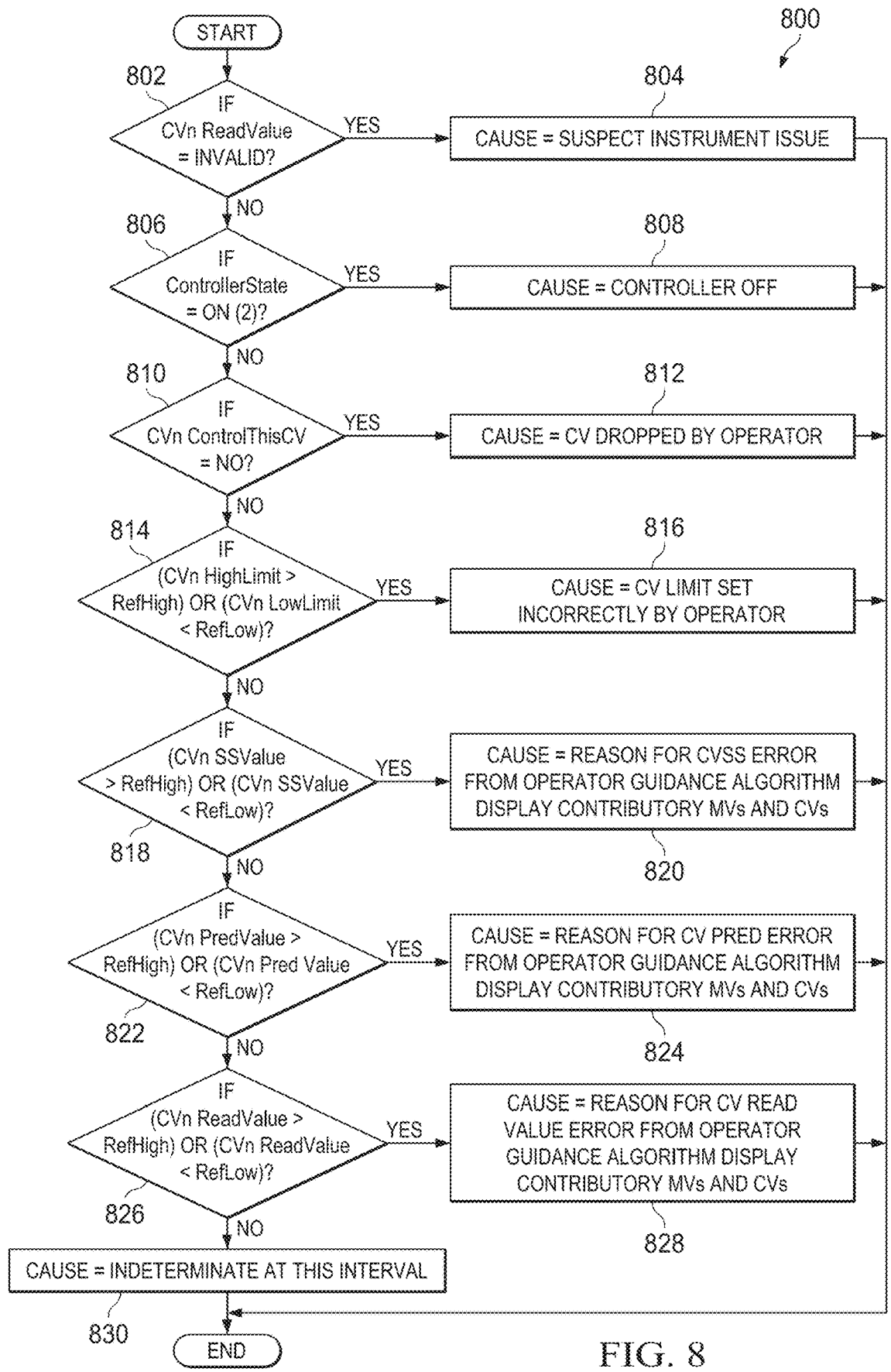

One or more probable causes for one or more of the identified constraint violation events are identified at step 410. This could include, for example, the processor 202 of the device 200 processing the collected data to identify behaviors of the industrial process and the model-based controller 106 prior to any constraint violation events and how the controller 106 was being used by one or more operators or other users prior to any constraint violation events. The probable causes of a constraint violation could be expressed in any suitable terms, such as in terms of actions that an operator took, process limitations, process disturbances, or poor controller actions. In particular embodiments, the approaches described in U.S. Patent Publication No. 2016/0349740 (which is hereby incorporated by reference in its entirety) could be used to support the identification of probable causes of constraint violations. One example technique for identifying probable causes of process variable constraint violations is shown in FIGS. 7 and 8, which are described below.

A graphical display identifying one or more probable causes for one or more of the constraint violation events is generated and presented to one or more users at step 412. This could include, for example, the processor 202 of the device 200 generating a graphical user interface that identifies one or more of the constraint violations and the probable cause(s) of the constraint violation(s) in a control-relevant context. The probable causes for a specific constraint violation could be ranked in order of decreasing or increasing likelihood, which can provide an indication of how likely each cause actually is the cause or one of the causes of the specific constraint violation. In some embodiments, the analysis results may be intended for different types of personnel, such as process managers, engineers, or other personnel. As a result, the analysis results could be expressed in appropriate terms for each type of user, and the analysis results could avoid the use of jargon commonly associated with advanced or model-based control if necessary or desirable for particular types of users.

Note that the process shown in FIG. 4 could be used to process data for one controlled variable or for multiple controlled variables (either sequentially or in parallel). In this way, the method 400 can be used to identify constraint violations in one or more process variables. The constraint violations could then be analyzed to identify probable causes, and at least one visualization can be generated for one or more users identifying the probable causes. Ideally, this information can be used to help take one or more correction actions that reduce or eliminate the constraint violations going forward. This helps to reduce the impacts of the constraint violations, which improves the operations of the model-based controller(s) as well as the underlying industrial process(es).

Although FIG. 4 illustrates one example of a method 400 for automated identification and diagnosis of constraint violations, various changes may be made to FIG. 4. For example, while shown as a series of steps, various steps in FIG. 4 could overlap, occur in parallel, occur in a different order, or occur any number of times.

FIGS. 5A and 5B illustrate an example method 500 for validating and filtering a process variable's value according to this disclosure. The method 500 could, for example, be performed during step 406 in the method of FIG. 4. For ease of explanation, the method 500 is described as being performed by the device 200 of FIG. 2 implementing an operator console 110, server 116, or device used in the computing cloud 118 of FIG. 1. However, the method 500 could be used with any suitable device and in any suitable system.

To summarize the method 500, a controlled variable's value can be checked against high and low sensible engineering bounds, a "bad" signal as reported by a control system, a high rate-of-change limit, and a minimum rate-of-change limit. The sensible engineering bounds can represent high and low limits based on the normal operating envelope of the controlled variable or a range that is slightly wider than the normal operating envelope. These bounds are typically more conservative than the instrument range for the actual equipment in an industrial process. The "bad" signal represents a signal that many control systems are able to generate and simply indicates that the current value of the controlled variable is invalid. Most process variables change significantly more slowly than the responsiveness of the process measurements because of process dynamics, so the high rate-of-change limit can be used to identify changes that occur excessively fast. Similarly, most process variables exhibit some movement due to process disturbances and control actions, so a completely static measurement value could indicate an instrumentation failure. During this process, the validation approach here uses a controller's predictions in order to detect valid and invalid data. For example, if a measured controlled variable value is above the sensible high engineering limit but is actually predicted by the controller within some tolerance, the data can be considered valid. If a measurement rate-of-change is high but predicted by the controller, the data can be considered valid. If a measurement value appears to be frozen but the predicted value is invariant, the data can be considered valid.

As shown in FIGS. 5A and 5B, start and end intervals of an analysis period are selected at step 502. This could include, for example, the processor 202 of the device 200 identifying the sampling or control interval that occurs at the beginning of the analysis period previously identified in step 402 and the sampling or control interval that occurs at the end of the analysis period previously identified in step 402. The start and end intervals define the total number of intervals to be examined.

Various values are initialized at step 504. This could include, for example, the processor 202 of the device 200 initializing an Interval value, which is used to represent the specific sampling or control interval being examined. This could also include the processor 202 of the device 200 initializing an IsBad flag, which is used to identify whether data during the specific sampling or control interval is valid or invalid. This could further include the processor 202 of the device 200 initializing a ValidCount value, which is used to count the number of intervals containing valid data. In addition, this could include the processor 202 of the device 200 initializing a Status array, which is used to identify whether each sampling or control interval contains valid or invalid data.

Tuning data for a specific controlled variable is obtained at step 506. This could include, for example, the processor 202 of the device 200 obtaining high and low limits (denoted ValHiLimit and ValLoLimit) for the controlled variable, which identify the upper and lower constraints placed on the controlled variable. This could also include the processor 202 of the device 200 obtaining a maximum rate-of-change limit (denoted ValROCLimit) for the controlled variable, which identifies how fast the controlled variable is allowed to change. This could further include the processor 202 of the device 200 obtaining a hold time value (denoted HoldTime), which identifies a consecutive number of sampling or control intervals during which valid data should exist before the intervals are actually identified as containing valid data. This can help to avoid identifying short bursts of data as being valid. This could also include the processor 202 of the device 200 obtaining a frozen tolerance value (denoted ValFrzTol) and a frozen time value (denoted ValFrzTim), which identify values used to determine whether unchanging values of the controlled variable are acceptable or indicative of invalid data. This could further include the processor 202 of the device 200 obtaining a prediction error limit (denoted CVPredErrLimit), which identifies a maximum allowable error between actual and predicted values of the controlled variable for data to be valid. This data could be obtained from any suitable source(s), such as directly from the model-based controller 106 or indirectly, such as via a historian 114, server 116, or gateway 120.

Controlled variable data for the current interval (as defined by the Interval value) is obtained at step 508. This could include, for example, the processor 202 of the device 200 obtaining the actual value of the controlled variable during the current interval (denoted CV.ReadValue) and the predicted value of the controlled variable during the current interval (denoted CV.PredictedValue). The actual value of the controlled variable could be based on a sensor measurement or an inferential calculation. The predicted value of the controlled variable could be obtained from a controller or calculated using a digital twin of the controller's optimizer. A prediction error is calculated at step 510. This could include, for example, the processor 202 of the device 200 calculating the absolute value of the difference between CV.ReadValue and CV.PredictedValue.

In step 512, a determination is made whether the control system has flagged the actual value of the controlled variable during the current interval as being invalid. In step 514, a determination is made whether the actual value of the controlled variable during the current interval exceeds its upper limit and whether the prediction error exceeds the prediction error limit (since it may be possible that exceeding the upper limit is expected). In step 516, a determination is made whether the actual value of the controlled variable during the current interval falls below its lower limit and whether the prediction error exceeds the prediction error limit (since it may be possible that falling below the lower limit is expected). If any of these conditions is true, the IsBad flag is set to true in order to indicate that the current interval contains invalid data at step 518, and the process skips to step 540. These steps can be performed by the processor 202 of the device 200 using the various data values introduced above.

If none of these conditions is true, the current interval may contain valid data. A check is made whether the IsBad flag is set to true at step 520. Note that during the first iteration, the IsBad flag is true as shown in step 504, but the IsBad flag could be false during subsequent iterations. Assuming this is the first iteration or the IsBad flag was set to true during a prior iteration, various values are assigned at step 522. This could include, for example, the processor 202 of the device 200 setting a last read value (denoted LastReadValue) of the controlled variable to equal the current actual value of the controlled variable and setting a last predicted value (denoted LastPredictedValue) of the controlled variable to equal the current predicted value of the controlled variable. This could also include the processor 202 of the device 200 setting the IsBad flag to false. This could further include the processor 202 of the device 200 assigning a value of zero to a frozen counter (denoted FrzTimCount), a frozen change value (denoted FrzChange), a predicted frozen change value (denoted PredFrzChange), and a hold counter (denoted HoldCount). These operations are performed since the current interval is possibly the first interval in a series of intervals containing valid data.

Otherwise, various values are calculated at step 524. This could include, for example, the processor 202 of the device 200 calculating a rate-of-change value (denoted ROC) of the controlled variable as the absolute value of the difference between the last read value of the controlled variable and the current actual value of the controlled variable. This could also include the processor 202 of the device 200 calculating a predicted rate-of-change value (denoted PredROC) of the controlled variable as the absolute value of the difference between the last predicted value of the controlled variable and the current predicted value of the controlled variable. A prediction error for the rate-of-change (denoted CVROCPredErr) can be calculated as the absolute value difference between the ROC and PredROC values. The frozen change value is updated by adding the ROC value to the frozen change value, the predicted frozen change value is updated by adding the CVROCPredErr value to the predicted frozen change value, and the frozen counter is incremented. The last read value of the controlled variable is set to equal the current actual value of the controlled variable. These operations are performed since the current interval is possibly a subsequent or final interval in a series of intervals containing valid data.

A determination is made whether the rate-of-change exceeds the rate-of-change limit and if the rate-of-change prediction error exceeds the error limit at step 526. This is done because it is possible that the measurement rate-of-change is high but is predicted, in which case the data can still be considered valid. If not, the process skips to step 540.

Otherwise, the process proceeds to step 528, where a determination is made whether the frozen change value exceeds the frozen tolerance value. If so, this indicates that the controlled variable's value is changing by some amount, so an equipment fault or other fault has not resulted in a frozen controlled variable value. In this case, the frozen counter and the frozen change value are reset to zero at step 530. A determination is made whether the frozen counter exceeds the frozen time value and whether the predicted frozen change value exceeds the frozen tolerance value at step 532. If both conditions are met, this is indicative that the controlled variable's value has frozen and that the freezing was not predicted. In that case, the process skips to step 540. Otherwise, any freezing of the controlled variable's value (if it is occurring) is predicted, so the current interval does contain valid data.

The ValidCount value is incremented at step 534, and a determination is made whether the ValidCount value exceeds the hold time value at step 536. If so, there have been an adequate number of consecutive valid intervals, so various values associated with the current interval are set at step 538. This could include, for example, the processor 202 of the device 200 marking the current interval as containing valid data and setting the ValidCount value to the hold time value. Conversely, during step 540 when there is invalid data in the current interval, the processor 202 of the device 200 could mark the current interval as containing invalid data and set the ValidCount value to zero.

A determination is made whether the current interval is the last interval of the analysis period at step 542. If not, the Interval value is incremented at step 544 to select the next interval to be analyzed, and the process returns to step 508. Otherwise, the process ends. The final results of the method 500 include a set of indicators that identify which intervals of the analysis period contain valid data and/or invalid data.

FIGS. 6A and 6B illustrate an example method 600 for detecting process variable constraint violations according to this disclosure. The method 600 could, for example, be performed during step 408 in the method of FIG. 4. For ease of explanation, the method 600 is described as being performed by the device 200 of FIG. 2 implementing an operator console 110, server 116, or device used in the computing cloud 118 of FIG. 1. However, the method 600 could be used with any suitable device and in any suitable system.

To summarize the method 600, a controlled variable's measurements are analyzed to identify deviations of the controlled variable outside of its reference high and low bounds. The reference bounds generally identify the agreed-upon high and low bounds for the controlled variable. The reference bounds can be established in any suitable manner and are typically based on guidance from a process engineer, licensor, or equipment vendor. It should be noted, however, that the actual high and low bounds used by a model-based controller 106 can often be set by an operator and can vary from these reference bounds.

In this example, four tuning factors are used to identify significant constraint violations in the presence of process noise. These tuning factors include a Delay_On value, a Delay_Off value, a Deadband value, and a Min_TID value. The Delay_On value identifies the minimum number of consecutive intervals for which a controlled variable violates its high or low reference bound (by more than the Deadband value) before the consecutive is deemed to be violated. This tuning factor can help to avoid identifying short-duration spikes as constraint violations. When this check is passed, the first interval of the constraint violation is deemed to be the start of an event. The Delay_Off value identifies the minimum number of consecutive intervals for which the controlled variable is within its high and low reference bounds before the constraint is deemed not to be violated. This tuning factor can help to reduce the likelihood of process noise triggering multiple sequential events, which can be better described as a single consolidated event. When this check is passed, the first interval of the non-constraint violation is deemed to be the end of the event. The Deadband value identifies a noise deadband that helps to mitigate the effects of process noise. The Min_TID value identifies the minimum time integrated deviation of the controlled variable that is considered to be a constraint violation. This tuning factor allows the Delay_On tuning factor to be overridden for short but significant constraint violations.

As shown in FIGS. 6A and 6B, start and end intervals of an analysis period are selected at step 602. This could include, for example, the processor 202 of the device 200 identifying the sampling or control interval that occurs at the beginning of the analysis period previously identified in step 402 and the sampling or control interval that occurs at the end of the analysis period previously identified in step 402. Note, however, that the same intervals identified in step 502 could be used here.

Various values are initialized at step 604. This could include, for example, the processor 202 of the device 200 initializing an Interval value, which is used to represent the specific sampling or control interval being examined. This could also include the processor 202 of the device 200 initializing D_On_Count and D_Off_Count values, which are used respectively to count the numbers of intervals in which a controlled variable is and is not violating an associated constraint. This could further include the processor 202 of the device 200 initializing an event number (denoted EventNum), which is used to distinguish different events (different constraint violations) for which data is being collected. This could also include the processor 202 of the device 200 initializing a start array (denoted Events_Start[ ]), an end array (denoted Events_End[ ]), and a time integration array (denoted Events_TI[ ]). The start and end arrays are used to store the start interval and end interval for each event that is identified, and the time integration array is used to measure the time integration deviation of the controlled variable for each event that is identified. In addition, this could include the processor 202 of the device 200 initializing an Active_Dev value, which is used to identify whether a controlled variable has been detected violating an associated constraint.

Threshold tuning data for a controlled variable is obtained at step 606. This could include, for example, the processor 202 of the device 200 obtaining the Delay_On, Delay_Off Deadband, and Min_TID values associated with a specific controlled variable used by a model-based controller 106. This data could be obtained from any suitable source(s), such as directly from the model-based controller 106 or indirectly, such as via a historian 114, server 116, or gateway 120.

Controlled variable data for the current interval (as defined by the Interval value) is obtained at step 608. This could include, for example, the processor 202 of the device 200 obtaining the controlled variable's actual value during the current interval (ReadValue). This could also include the processor 202 of the device 200 obtaining constraint information for the controlled variable, such as the controlled variable's high limit (denoted HighLimit) and low limit (denoted LowLimit). This data could be obtained from any suitable source(s), such as directly from the model-based controller 106 or indirectly, such as via a historian 114, server 116, or gateway 120.

Deviation values are calculated at step 610. This could include, for example, the processor 202 of the device 200 identifying a first deviation value Deviation as the maximum of zero, (ReadValue−HighLimit−Deadband), and (LowLimit−Deadband−ReadValue). This value is zero when no constraint violation is occurring or is greater than zero when (i) the controlled variable's actual value exceeds the high limit or falls below the low limit by more than the Deadband value or (ii) the controlled variable's actual value exceeds the high limit or falls below the low limit by less than the Deadband value. This could also include the processor 202 of the device 200 identifying a second deviation value Deviation* as the maximum of zero, (ReadValue−HighLimit), and (LowLimit−ReadValue). This value is zero when no constraint violation is occurring or is greater than zero when the controlled variable's actual value exceeds the high limit or falls below the low limit (without reference to the Deadband value).

A determination is made whether the deviation is greater than zero at step 612, which would indicate whether the controlled variable's constraint is being violated considering the deadband. If so, the time integration deviation for a possible event is incremented at step 614. This could include, for example, the processor 202 of the device 200 multiplying the first deviation value Deviation by a sampling interval of the model-based controller (denoted SamplePeriod) and adding the result to the current time integration deviation. A determination is made whether this is the possible start of a constraint violation event at step 616. This could include, for example, the processor 202 of the device 200 determining whether the Active_Dev flag is set to true. If this is not the possible start of a constraint violation, the current interval is a continuation of a previously-detected constraint violation, and an Off_Count value is set to an Off_Delay value at step 618. Otherwise, this is the possible start of a constraint violation, and a determination is made whether an On_Count value has reached or exceeded a Delay_On value or whether the time integration deviation for the current event has exceeded the Min_TID value at step 620. Either condition indicates that the current interval is the start of an actual constraint violation and not merely noise. If not, the On_Count value is incremented at step 622. Otherwise, the start of a constraint violation has been detected, and various values for the new event are identified at step 624. This could include, for example, the processor 202 of the device 200 setting the Active_Dev value to true and setting the Off_Count value to the Off_Delay value. This could also include the processor 202 of the device 200 identifying the start of the current event as the value of the current interval minus the Delay_On value.

If the deviation is not greater than zero at step 614, this would indicate that the controlled variable's constraint is not being violated considering the deadband. A determination is made whether this is the end of a previously-detected event at step 626. This could include, for example, the processor 202 of the device 200 determining whether the Active_Dev flag is set to true. If so, a determination is made whether an adequate number of intervals without a constraint violation have been detected at step 628. This could include, for example, the processor 202 of the device 200 determining whether the Off_Count value is less than or equal to zero. If not, a determination is made whether the controlled variable's value is outside of its constraints without reference to the deadband at step 630. This could include, for example, the processor 202 of the device 200 determining whether the Deviation* value equals zero. The Off_Count value is decremented at step 632 depending on the determination. If adequate intervals without a constraint violation have been detected, the end of an event has been identified, and various values for the event are determined at step 634. This could include, for example, the processor 202 of the device 200 setting the Active_Dev value to false and setting the On_Count value to zero. This could also include the processor 202 of the device 200 setting the time integration deviation for the current event to zero. This could further include the processor 202 of the device 200 incrementing the event number and identifying the end of the current event as the value of the current interval minus the Delay_Off value.

Step 638 can be reached via any of steps 618, 622, 624, 632, 634, and 636. At step 638, the Interval value is incremented, and a determination is made whether the current interval is the last interval of the analysis period at step 640. If not, the process returns to step 608 to collect information about the next interval. Otherwise, a determination is made whether the Active_Dev value is true at step 642, which would indicate that the analysis period ended with the controlled variable violating a constraint. If not, the total number of events detected (denoted NumEvents) is set equal to EventNum minus one at step 644. Otherwise, various values for the current event are determined at step 646. This could include, for example, the processor 202 of the device 200 setting the end of the current event to the current interval and setting the total number of events detected to EventNum. The final results of the method 600 include a set of significant constraint violation events for each analyzed controlled variable.

FIGS. 7 and 8 illustrate example methods 700 and 800 for determining probable causes of process variable constraint violations according to this disclosure. The methods 700 and 800 could, for example, be performed during step 410 in the method of FIG. 4. For ease of explanation, the methods 700 and 800 are described as being performed by the device 200 of FIG. 2 implementing an operator console 110, server 117, or device used in the computing cloud 118 of FIG. 1. However, the methods 700 and 800 could be used with any suitable device and in any suitable system.

To summarize the methods 700 and 800, a time window to analyze a controller's behavior related to a constraint violation event is selected, such as a window that starts one process settling time before the start of the constraint violation event and ending at a configurable multiple of the process settling time before the end of the constraint violation event. In some embodiments, the configurable multiple by default could be 0.5, although other values could be used. Each controller interval in the selected time window is analyzed to provide an estimate of the cause of the constraint violation event for that time window. For some intervals (such as early intervals when an event is in its formation), there may not be an identified cause, in which case the cause can be logged as indeterminate. As part of this process, operator-guidance techniques described in U.S. Patent Publication No. 2016/0349740 could be used. The different contributory causes to the constraint violation event over all of the intervals in the time window are then integrated to identify the probable cause(s) of the constraint violation event.

As shown in FIG. 7, configuration data for a controlled variable is obtained at step 702. This could include, for example, the processor 202 of the device 200 obtaining the steady-state settling interval (SSSI) of a selected controlled variable. This data could be obtained from any suitable source(s), such as directly from the model-based controller 106 or indirectly, such as via a historian 114, server 116, or gateway 120. An event number (denoted EvtIdx) is initialized to zero at step 704, which results in the selection of the first event identified earlier.

Various values are determined to define a time window for the current event at step 706. This could include, for example, the processor 202 of the device 200 defining the start of the time window (denoted StartInt) as the start of the event identified above minus the steady-state settling interval. This could also include the processor 202 of the device 200 defining the end of the time window (denoted EndInt) as the end of the event identified above minus a multiple of the steady-state settling interval (which here is 0.5 although other values could be used). A first interval during the time window is selected at step 708. This could include, for example, the processor 202 of the device 200 setting an Interval value to the start of the time window.

Controlled variable data for the current interval (as defined by the Interval value) is obtained at step 710. This could include, for example, the processor 202 of the device 200 obtaining the controlled variable's steady-state value, predicted value, and actual value during the current interval. This could also include the processor 202 of the device 200 obtaining the controlled variable's reference limits and high and low limits (as noted above, the high and low limits can be set by an operator and may differ from the reference limits). This could further include the processor 202 of the device 200 obtaining a "control this CV" value (indicating whether an operator allowed the controlled variable to be used by a controller 106) and the control state of the controller 106, as well as any operator guidance codes associated with the controlled variable. This data could be obtained from any suitable source(s), such as directly from the model-based controller 106 or indirectly, such as via a historian 114, server 116, or gateway 120. At least some of this data could also be obtained using the digital twin of the controller's optimizer. In addition, this could include the processor 202 of the device 200 obtaining possible causes and those causes' possible contributions to the controlled variable's constraint violation for the current event. The possible causes and possible contributions could be identified in any suitable manner. In some embodiments, the possible causes and contributions could be identified using the "CV move cause estimation toolkit" described in U.S. Pat. No. 8,108,790 (which is hereby incorporated by reference in its entirety).

A best explanation for the constraint violation in the current interval is determined at step 712. This could include, for example, the processor 202 of the device 200 performing the method 800 shown in FIG. 8. Each independent variable that impacts the controlled variable is identified and various values are calculated for each independent variable at step 714. This could include, for example, the processor 202 of the device 200 integrating the controlled variable changes that result from each independent variable and model bias. This could also include the processor 202 of the device 200 integrating the absolute (squared) controlled variable changes that result from each independent variable and the model bias. The model bias is generally known from the model used by the controller 106 for the controlled variable. A counter associated with the best explanation for the constraint violation is incremented at step 716. This allows the processor 202 of the device 200 to track how many times different possible explanations for constraint violations are identified as the best explanations over all intervals being examined. A determination is made whether the last interval in the time window has been processed at step 718. If not, the Interval value is incremented at step 720, and the process returns to step 710 to process the next interval's data.

Otherwise, all intervals in the time window have been processed, and a subset of the independent variables is identified at step 722. This could include, for example, the processor 202 of the device 200 identifying the independent variables that contributed at least a specified percentage to the total integrated absolute controlled variable changes during all analyzed intervals in the time window. The specified percentage could have any suitable value (such as 10%) and could be user-defined. The most dominant reasons or likely reasons for the constraint violation in the time window are identified at step 724. This could include, for example, the processor 202 of the device 200 identifying the most-common best explanations that were identified across all intervals based on their counters.

A determination is made whether the last event for the controlled variable has been processed at step 726. If not, the EvtIdx value is incremented at step 728, and the process returns to step 706 to process the next event's data. Otherwise, the process ends. The final results of the method 700 include the subset of independent variables and most dominant reasons that were identified for a specific controlled variable's constraint violations, which can be used to generate the graphical display in step 412. For example, information about the constraint violations (such as their frequencies, magnitudes, and probable causes) can be stored in a database for further analysis, such as segmentation of the data by operating shift and by operating mode.

As noted above, the method 800 analyzes data in order to identify the best explanation for a constraint violation in a current interval during step 712 of FIG. 7. As shown in FIG. 8, the method 800 involves a series of determinations to identify the best explanation for a constraint violation. A determination is made whether the current value for a controlled variable is invalid at step 802. If so, the likely cause is identified as an instrumentation issue (such as a faulty sensor or valve) at step 804. A determination is made whether a model-based controller has been turned off or otherwise placed into a state where control actions are not occurring with respect to a particular controlled variable at step 806. If so, that is identified as the likely cause at step 808. A determination is made whether an operator elected to drop the controlled variable from use or consideration by the model-based controller at step 810. If so, that is identified as the likely cause at step 812. A determination is made whether the current high limit for the controlled variable exceeds the reference high limit or whether the current low limit for the controlled variable falls below the reference low limit at step 814. If so, the likely cause is identified as a limit being incorrectly set by an operator at step 816.

If the controlled variable's steady-state value exceeds the reference high limit or falls below the reference low limit at step 818, the reason for the steady-state error can be identified using the toolkit described in U.S. Pat. No. 8,108,790 at step 820. If the controlled variable's predicted value exceeds the reference high limit or falls below the reference low limit at step 822, the reason for the predicted error can be identified using the toolkit described in U.S. Pat. No. 8,108,790 at step 824. If the controlled variable's actual value exceeds the reference high limit or falls below the reference low limit at step 826, the reason for the actual error can be identified using the toolkit described in U.S. Pat. No. 8,108,790 at step 828. In any of these cases, the controlled or manipulated variables contributing or substantially contributing to the error can be identified and output as part of a graphical display. If none of these conditions is met, the cause is identified as indeterminate at step 830. As noted above, this may occur for some intervals, such as early intervals when a constraint violation event is in its formation and no probable cause for the constraint violation can be identified yet using available data.

Although FIGS. 5A through 8 illustrate example methods for performing operations in the method 400 of FIG. 4, various changes may be made to FIGS. 5A through 8. For example, while shown as a series of steps, various steps in each figure could overlap, occur in parallel, occur in a different order, or occur any number of times. Also, while specific variables and operations have been described here, these relate to specific implementations of the operations in the method 400 of FIG. 4. Those operations in FIG. 4 could be performed in any other suitable manner.

Figure 9:
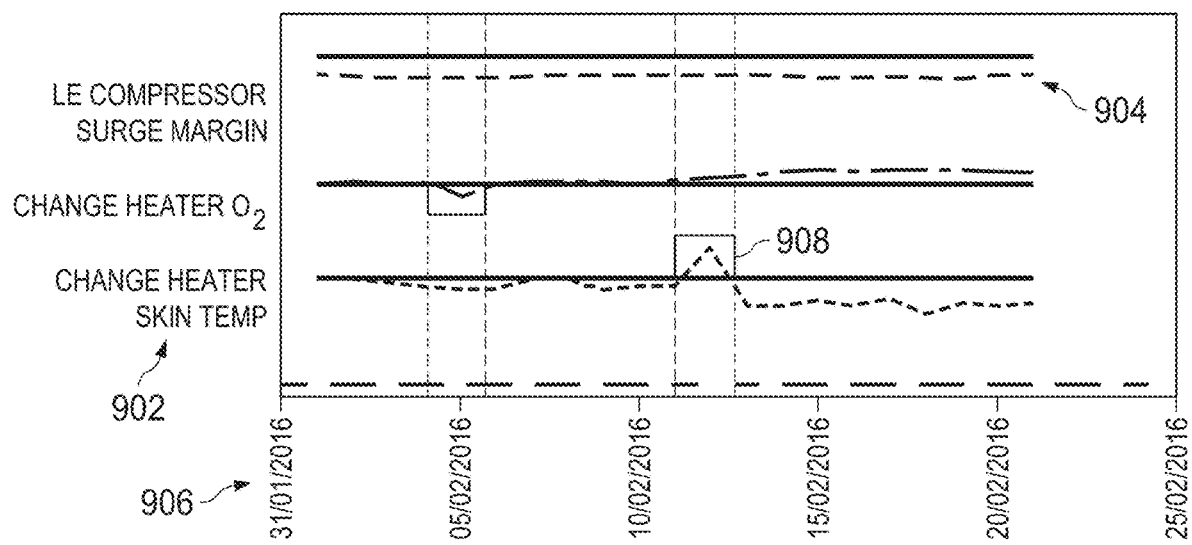
FIG. 9 illustrates an example graphical user interface for identifying process variable constraint violations according to this disclosure.

FIG. 9 illustrates an example graphical user interface 900 for identifying process variable constraint violations according to this disclosure. The graphical user interface 900 could, for example, be generated during step 412 in the method of FIG. 4. For ease of explanation, the graphical user interface 900 is described as being generated by the device 200 of FIG. 2 implementing an operator console 110, server 116, or device used in the computing cloud 118 of FIG. 1. However, the graphical user interface 900 could be generated by any suitable device and in any suitable system.

As shown in FIG. 9, the graphical user interface 900 identifies multiple process variables 902 and contains a pair of lines 904 associated with each process variable 902. In each pair of lines 904, one line identifies the actual value of the associated process variable during a given time period 906, and another line identifies a constraint (upper or low) placed on the associated process variable. If any constraint violations are detected as described above, a marker 908 can be placed around the portions of the associated lines 904 to identify where the actual process variable value violated the constraint. In some embodiments, each marker 908 could denote a hyperlink that can be selected by a user to view information about the associated constraint violation.

Figure 10:
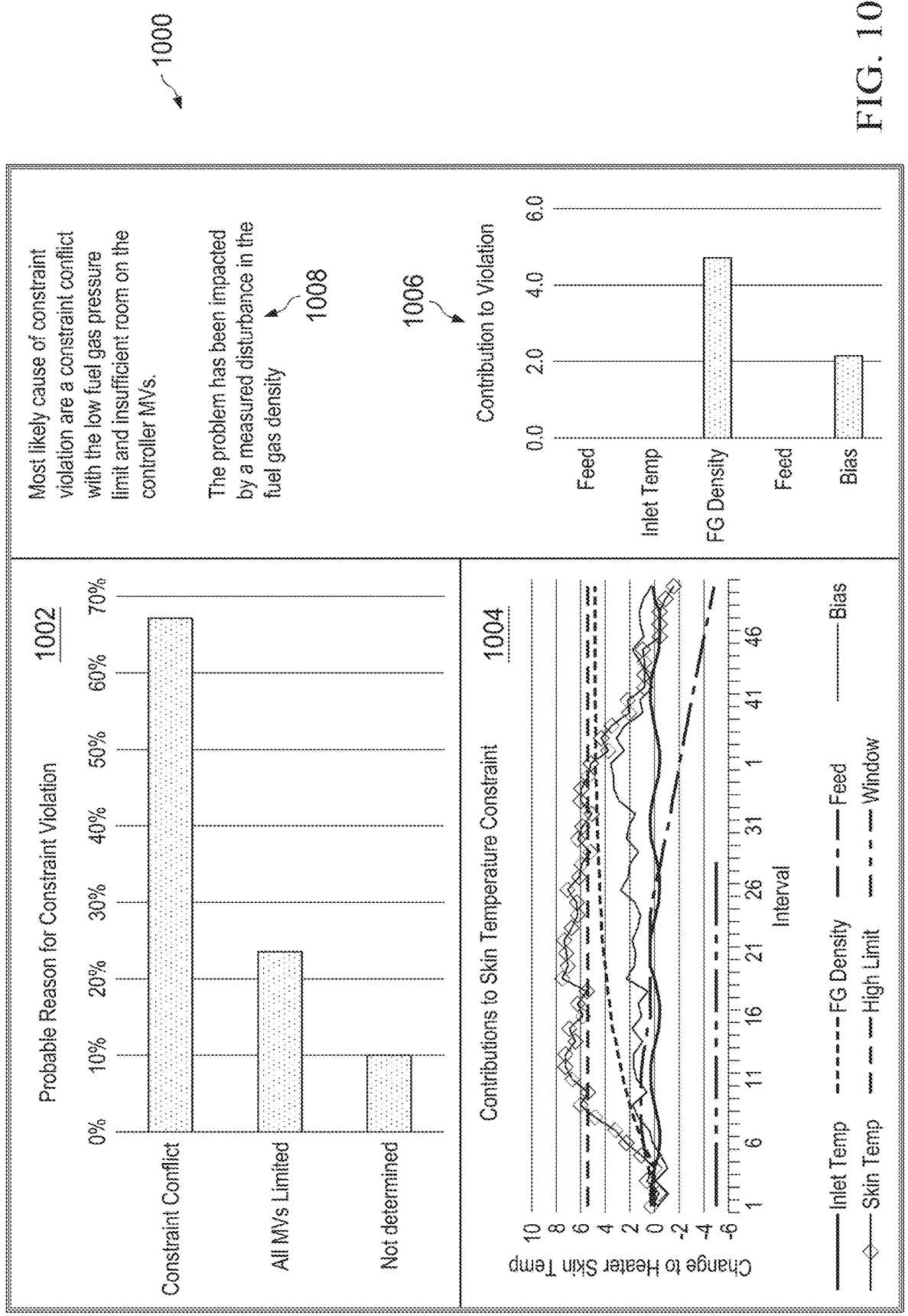
FIG. 10 illustrates an example graphical user interface for identifying probable causes of process variable constraint violations according to this disclosure.

FIG. 10 illustrates an example graphical user interface 1000 for identifying probable causes of process variable constraint violations according to this disclosure. The graphical user interface 1000 could, for example, be generated during step 412 in the method of FIG. 4, such as after a user has selected one of the markers 908 shown in the graphical user interface 900. For ease of explanation, the graphical user interface 1000 is described as being generated by the device 200 of FIG. 2 implementing an operator console 110, server 116, or device used in the computing cloud 118 of FIG. 1. However, the graphical user interface 1000 could be generated by any suitable device and in any suitable system.

As shown in FIG. 10, the graphical user interface 1000 provides a list 1002 of the probable causes for a selected constraint violation. In this example, the list 1002 includes a label identifying each probable cause and a percentage identifying the likelihood that the associated probable cause is an actual cause of the selected constraint violation. The graphical user interface 1000 also provides a graphical representation 1004 plotting the process variable that violated a constraint (skin temperature change in this example), the associated constraint that was violated, and the main contributory effects from independent variables and unmeasured disturbances on the process variable. Note that these are not the actual independent variables' trends but rather their predicted impacts on the process variable. The duration of an analysis window is also illustrated in the graphical representation 1004. The graphical user interface 1000 further provides a graph 1006 identifying the total effects (in the aggravating direction) of how each independent variable may have contributed to the constraint violation. In addition, the graphical user interface 1000 includes a textual summary 1008 of the other information displayed in the interface 1000. The information contained in the graphical user interface 1000 could be obtained by performing the processes described above.

A user could view the graphical user interface 900 (either individually or as part of a larger graphical display) in order to view identified constraint violations. For each constraint violation, the user could select the marker 908 for that constraint violation to view the graphical user interface 1000 and identify likely causes of that constraint violation. Ideally, this allows the user to perform or initiate performance of actions that can help to reduce or resolve the likely causes of the constraint violations. This can help to reduce future constraint violations and improve the performance of at least one associated model-based controller 106.

Although FIGS. 9 and 10 illustrate examples of graphical user interfaces 900 and 1000 for identifying process variable constraint violations and probable causes of constraint violations, various changes may be made to FIGS. 9 and 10. For example, the content and layout of each graphical user interface 900 and 1000 could vary as needed or desired. As a particular example, the graphical user interface 900 or 1000 could vary based on the user role of the user who is to view the graphical user interface. Also, constraint violations and probable causes of the constraint violations could be identified to users in any other suitable manner.

Note that the techniques for automated identification and diagnosis of constraint violations described above could be used or operate in conjunction with any combination or all of various features described in the provisional patent applications incorporated by reference above and/or in the following concurrently-filed patent applications (all of which are hereby incorporated by reference):

U.S. patent application Ser. No. 15/973,272 entitled "APPARATUS AND METHOD FOR IDENTIFYING IMPACTS AND CAUSES OF VARIABILITY OR CONTROL GIVEAWAY ON MODEL-BASED CONTROLLER PERFORMANCE";

U.S. patent application Ser. No. 15/972,534 entitled "APPARATUS AND FOR ESTIMATING INAPACTS OF OPERATIONAL PROBLEMS IN ADVANCED CONTROL OPERATIONS FOR INDUSTRIAL CONTROL SYSTEMS"; and U.S. patent application Ser. No. 15/972,535 entitled "APPARATUS AND METHOD FOR IDENTIFYING, VISUALIZING, AND TRIGGERING WORKFLOWS FROM AUTO-SUGGESTED ACTIONS TO RECLAIM LOST BENEFITS OF MODEL-BASED INDUSTRIAL PROCESS CONTROLLERS".

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining data identifying values of one or more process variables associated with an industrial process controller, wherein the industrial process controller is configured to control the one or more process variables, wherein the one or more process variables comprises one or more manipulated variables and one or more controlled variables for controlling an industrial process, wherein the one or more controlled variables are controllable at a desired set point or within a predefined range of values and the one or more manipulated variables are adjustable in order to alter the one or more controlled variables;
    identifying one or more constraint violations corresponding to the one or more process variables based on the obtained data and a number of consecutive intervals when at least one controlled variable of the one or more controlled variables rises to exceed an upper limit or falls below a lower limit;
    analyzing for a first time period prior to each of the one or more identified constraint violations each of: a behavior of the industrial process controller and one or more operator actions;
    analyzing for a second time period, the behavior of the industrial process controller during the each of the one or more identified constraint violations;
    identifying one or more probable causes of each of the one or more identified constraint violations based on the analysis for the first time period and the second time period;
    defining the one or more probable causes based on each of: the behavior of the industrial process controller and the one or more operator actions, wherein the behavior of the industrial process controller is associated with at least one of: a component failure, a state of the industrial process controller, one or more process limitations, one or more process disturbances, and one or more controller actions;
    identifying each of the one or more manipulated variables associated with the one or more probable causes for each of the one or more identified constraint violations;
    calculating a contribution percentage for each of the one or more manipulated variables to at least one identified constraint violation between the first time period and the second time period, wherein the contribution percentage for each of the one or more manipulated variables is above a specific threshold value;
    generating a ranked list of the one or more probable causes of each of the one or more identified constraint violations, wherein the one or more probable causes are ranked in one of increasing order or decreasing order indicating likelihood of each of the one or more probable causes to be an actual cause of the one or more identified constraint violations;
    generating a display output configured to display the ranked list of the one or more probable causes for each of the one or more identified constraint violations and the contribution percentage of each of the one or more manipulated variables for each of the one or more identified constraint violations; and
    modifying each of the one or more manipulated variables in order to set the one or more controlled variables within predefined limits to resolve each of the one or more identified constraint violations.

2. The method of claim 1, further comprising:
    validating the obtained data prior to identifying the one or more constraint violations;
    wherein validating the obtained data comprises at least one of:
        removing a portion of the data deemed invalid; and
        identifying valid or invalid data using predictions generated by an optimizer associated with the industrial process controller.

3. The method of claim 1,
    wherein at least one probable cause of the one or more probable causes for a specific one of the one or more constraint violations is identified by:
        repeatedly defining a time window in the data and identifying estimated causes of the one or more constraint violations using the data that is within the time window; and
        aggregating the estimated causes of the one or more constraint violations, wherein for the one or more constraint violations, the time window extends from a first time prior to a start point in time of the one or more constraint violations to a second time, the first time and the second time based on a steady-state settling interval of the one or more process variables associated with the one or more constraint violations.

4. The method of claim 1, wherein the display output comprises displaying at least one of:
    one or more process variable values plotted over time;
    an identification of at least one process variable that contributed to at least one of the one or more constraint violations; and
    the one or more probable causes and a probability for each probable cause of the one or more probable causes.

5. The method of claim 1 further comprising:
    identifying a start point in time of a constraint violation of the one or more constraint violations when a value of a process variable of the one or more process variables rises to exceed the upper limit or falls below the lower limit by at least a specified amount; and identifying an end point in time of the constraint violation when the value of the process variable returns back between the upper limit and the lower limit, wherein the start point in time of the constraint violation and the end point in time of the constraint violation is identified to determine a validity of the process variable.

6. The method of claim 1, further comprising displaying a textual summary of the identified one or more probable causes for each identified constraint violation.

7. The method of claim 1, wherein the data identifying values of the one or more process variables associated with the industrial process controller is obtained from at least one of: a historian, a server, a gateway, and a digital twin of an optimizer of the industrial process controller.

8. An apparatus comprising:
at least one interface configured to receive data identifying values of one or more process variables associated with an industrial process controller, wherein the industrial process controller is configured to control the one or more process variables, wherein the one or more process variables comprises one or more manipulated variables and one or more controlled variables for controlling an industrial process, wherein the one or more controlled variables are controllable at a desired set point or within a predefined range of values and the one or more manipulated variables are adjustable in order to alter the one or more controlled variables; and at least one processor configured to:
identify one or more constraint violations corresponding to the one or more process variables based on the obtained data and a number of consecutive intervals when at least one controlled variable of the one or more controlled variables rises to exceed an upper limit or falls below a lower limit;

analyze for a first time period prior to each of the one or more identified constraint violations each of: a behavior of the industrial process controller and one or more operator actions;

analyze for a second time period, the behavior of the industrial process controller during the each of the one or more identified constraint violations;

identify one or more probable causes of each of the one or more identified constraint violations based on the analysis for the first time period and the second time period;

define the one or more probable causes based on each of: the behavior of the industrial process controller and the one or more operator actions, wherein the behavior of the industrial process controller is associated with at least one of: a component failure, a state of the industrial process controller, one or more process limitations, one or more process disturbances, and one or more controller actions;

identify each of the one or more manipulated variables associated with the one or more probable causes for each of the one or more identified constraint violations;

calculate a contribution percentage for each of the one or more manipulated variables to each of the identified constraint violation between the first time period and the second time period, wherein the contribution percentage for each of the one or more manipulated variables is above a specific threshold value;

generate a ranked list of the one or more probable causes of each of the one or more identified constraint violations, wherein the one or more probable causes are ranked in one of increasing order or decreasing order indicating likelihood of each of the one or more probable causes to be an actual cause of the one or more identified constraint violations;

generate a display output configured to display the ranked list of the one or more probable causes for each of the one or more identified constraint violations and the contribution percentage of each of the one or more manipulated variables for each of the one or more identified constraint violations; and modify each of the one or more manipulated variables in order to set the one or more controlled variables within predefined limits to resolve each of the one or more identified constraint violations.

9. The apparatus of claim 8, wherein
the at least one processor is configured to:
validate the data prior to identifying the one or more constraint violations by performing at least one of:
remove a portion of the data deemed invalid; and
identify valid or invalid data by using predictions generated by an optimizer associated with the industrial process controller.

10. The apparatus of claim 8, wherein:
the at least one processor is further configured to:
identify the one or more probable causes for the at least one of the one or more constraint violations based on:
repeatedly defining a time window in the data and identify estimated causes of the one or more constraint violations using the data that is within the time window; and
aggregating the estimated causes of the one or more constraint violations, wherein, for the one or more constraint violations, the time window extends from a first time prior to a start of the one or more constraint violations to a second time, the first time and the second time based on a steady-state settling interval of the one or more process variables associated with the one or more constraint violations.

11. The apparatus of claim 8, wherein the at least one processor is further configured to cause display of at least one of:
one or more process variable values plotted over time;
an identification of at least one process variable that contributed to at least one of the one or more constraint violations; and
the one or more probable causes and a probability for each probable cause of the one or more probable causes.

12. The apparatus of claim 8, wherein the at least one processor is further configured to:
identify a start point in time of a constraint violation of the one or more constraint violations when a value of a process variable of the one or more process variables rises to exceed the upper limit or falls below the lower limit by at least a specified amount; and
identify an end point in time of the constraint violation when the value of the process variable returns back between the upper limit and the lower limit,
wherein the start point in time of the constraint violation and the end point in time of the constraint violation is identified to determine a validity of the process variable.

13. The apparatus of claim 8, wherein the at least one processor is configured to cause display of a textual summary of the identified one or more probable causes for each identified constraint violation.

14. The apparatus of claim 8, wherein the data identifying values of the one or more process variables associated with the industrial process controller is obtained from at least one of: a historian, a server, a gateway, and a digital twin of an optimizer of the industrial process controller.

15. A non-transitory computer readable medium containing instructions that when executed cause at least one processing device to:
- obtain data identifying values of one or more process variables associated with an industrial process controller, wherein the industrial process controller is configured to control the one or more process variables, wherein the one or more process variables comprises one or more manipulated variables and one or more controlled variables for controlling an industrial process, wherein the one or more controlled variables are controllable at a desired set point or within a predefined range of values and the one or more manipulated variables are adjustable in order to alter the one or more controlled variables;
- identify one or more constraint violations corresponding to the one or more process variables based on the obtained data and a number of consecutive intervals when at least one controlled variable of the one or more controlled variables rises to exceed an upper limit or falls below a lower limit;
- analyze for a first time period prior to each of the one or more identified constraint violations each of: a behavior of the industrial process controller and one or more operator actions;
- analyze for a second time period, the behavior of the industrial process controller during the each of the one or more identified constraint violations;
- identify one or more probable causes of each of the one or more identified constraint violations based on the analysis for the first time period and the second time period;
- define the one or more probable causes based on each of: the behavior of the industrial process controller and the one or more operator actions, wherein the behavior of the industrial process controller is associated with at least one of: a component failure, a state of the industrial process controller, one or more process limitations, one or more process disturbances, and one or more controller actions;
- identify each of the one or more manipulated variables associated with the one or more probable causes for each of the one or more identified constraint violations;
- calculate a contribution percentage for each of the one or more manipulated variables to each of the identified constraint violation between the first time period and the second time period, wherein the contribution percentage for each of the one or more manipulated variables is above a specific threshold value;
- generate a ranked list of the one or more probable causes of each of the one or more identified constraint violations, wherein the one or more probable causes are ranked in one of increasing order or decreasing order indicating likelihood of each of the one or more probable causes to be an actual cause of the one or more identified constraint violations;
- generate a display output configured to display the ranked list of the one or more probable causes for each of the one or more identified constraint violations the contribution percentage of each of the one or more manipulated variables for each of the one or more identified constraint violations; and
- modify each of the one or more manipulated variables in order to set the one or more controlled variables within predefined limits to resolve each of the one or more identified constraint violations.

16. The non-transitory computer readable medium of claim 15, further containing instructions that when executed cause the at least one processing device to validate the obtained data prior to identifying the one or more constraint violations and remove a portion of the data deemed invalid.

17. The non-transitory computer readable medium of claim 15, further containing instructions that when executed cause the at least one processing device to identify the one or more probable causes for the at least one of the one or more constraint violations based on:
- repeatedly defining a time window in the data and identify estimated causes of the constraint violation using the data that is within the time window; and
- aggregating the estimated causes of the one or more constraint violations, wherein, for the one or more constraint violations, the time window extends from a first time prior to a start of the one or more constraint violations to a second time, the first time and the second time based on a steady-state settling interval of the one or more process variables associated with the one or more constraint violations.

18. The non-transitory computer readable medium of claim 15, further containing instructions that when executed cause the at least one processing device to cause displaying of at least one of:
- one or more process variable values plotted over time;
- an identification of at least one process variable that contributed to at least one of the one or more constraint violations; and
- the one or more probable causes and a probability for each probable cause of the one or more probable causes.

19. The non-transitory computer readable medium of claim 15, further containing instructions that when executed cause the at least one processing device to cause displaying of a textual summary of the identified one or more probable causes for each identified constraint violation.

20. The non-transitory computer readable medium of claim 15, wherein the data identifying values of the one or more process variables associated with the industrial process controller is obtained from at least one of: a historian, a server, a gateway, and a digital twin of an optimizer of the industrial process controller.

* * * * *